US008943043B2

(12) United States Patent
Lymberopoulos et al.

(10) Patent No.: US 8,943,043 B2
(45) Date of Patent: Jan. 27, 2015

(54) DYNAMIC COMMUNITY-BASED CACHE FOR MOBILE SEARCH

(75) Inventors: Dimitrios Lymberopoulos, Bellevue, WA (US); Emmanouil Koukoumidis, Athens (GR); Jie Liu, Medina, WA (US); Feng Zhao, Issaquah, WA (US); Douglas Christopher Burger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 12/692,626

(22) Filed: Jan. 24, 2010

(65) Prior Publication Data

US 2011/0184936 A1    Jul. 28, 2011

(51) Int. Cl.
*G06F 17/00* (2006.01)
*G06F 17/30* (2006.01)

(52) U.S. Cl.
CPC .............................. *G06F 17/30902* (2013.01)
USPC ........................................................ 707/721

(58) Field of Classification Search
USPC ........................................................ 707/767
See application file for complete search history.

(56) References Cited

U.S. PATENT DOCUMENTS

| 7,548,915 | B2 | 6/2009 | Ramer et al. | |
|---|---|---|---|---|
| 2003/0225885 | A1* | 12/2003 | Rochberger et al. | 709/226 |
| 2006/0002320 | A1 | 1/2006 | Costa-Requena et al. | |
| 2007/0061244 | A1 | 3/2007 | Ramer et al. | |
| 2007/0100650 | A1* | 5/2007 | Ramer et al. | 705/1 |
| 2007/0143255 | A1 | 6/2007 | Mathur et al. | |
| 2007/0214131 | A1 | 9/2007 | Cucerzan et al. | |
| 2008/0005695 | A1 | 1/2008 | Ozzie et al. | |
| 2008/0071776 | A1 | 3/2008 | Cho et al. | |
| 2008/0071988 | A1 | 3/2008 | Schloter et al. | |
| 2008/0207182 | A1 | 8/2008 | Maharajh et al. | |
| 2008/0243776 | A1 | 10/2008 | Brunner et al. | |
| 2008/0270379 | A1 | 10/2008 | Ramakrishna | |
| 2009/0287684 | A1 | 11/2009 | Bennett | |

OTHER PUBLICATIONS

Ku et al., "Location-Based Spatial Query Processing in Wireless Broadcast Environments", IEEE Transactions on Mobile Computing, vol. 7, No. 6, Jun. 2008.*

(Continued)

*Primary Examiner* — James Trujillo
*Assistant Examiner* — Mohsen Almani
(74) *Attorney, Agent, or Firm* — Steve Wight; Judy Yee; Micky Minhas

(57) ABSTRACT

A "Community-Based Mobile Search Cache" provides various techniques for maximizing the number of query results served from a local "query cache", thereby significantly limiting the need to connect to the Internet or cloud using 3G or other wireless links to service search queries. The query cache is constructed remotely and downloaded to mobile devices. Contents of the query cache are determined by mining popular queries from mobile search logs, either globally or based on queries of one or more groups or subgroups of users. In various embodiments, searching and browsing behaviors of individual users are evaluated to customize the query cache for particular users or user groups. The content of web pages related to popular queries may also be included in the query cache. This allows cached web pages to be displayed without first displaying cached search results when a corresponding search result has a sufficiently high click-through probability.

19 Claims, 7 Drawing Sheets

(56) References Cited

OTHER PUBLICATIONS

Hosseini et al., "Mining Search Engine Query Log for Evaluating Content and Structure of a Web Site", 2007 IEEE/WIC/ACM International Conference on Web Intelligence.*

Ozcan et al., "Space Efficient Caching of Query Results in Search Engines", 2008 IEEE.*

Hopfner, et al., "Towards Trie-Based Query Caching in Mobile DBS", Retrieved at << http://subs.emis.de/LNI/Proceedings/Proceedings43/GI-Proceedings.43-11.pdf>>, pp. 106-121.

Said, et al., "Data Prefetching Algorithm in Mobile Environments", Retrieved at << http://www.eurojournals.com/ejsr_28_3_14.pdf>>, European Journal of Scientific Research, vol. 28, No. 3, 2009, pp. 478-491.

Agarwal, Sachin, "Intelligent Content Caching for Mobile Devices", Retrieved at << http://www.deutsche-telekom-laboratories.de/~agarwals/publications/ict2006.pdf>>, Proceedings of The 13th International Conference on Telecommunications, May 9-12, 2006, pp. 4.

Sorrel, Charlie, "2TB Memory Cards Coming Soon", Retrieved at << http://www.wired.com/gadgetlab/2009/01/two-terabyte-sd>>, Gadget Lab, Hardware News and Review, Jan. 12, 2009, pp. 1.

Balasubramanian, et al., "Enhancing Interactive Web Applications in Hybrid Networks", Retrieved at << http://www.cs.umass.edu/~arun/papers/thedu.pdf>>, Proceedings of the 14th ACM international conference on Mobile computing and networking, Sep. 14-19, 2008, pp. 11.

Church, et al., "A Large Scale Study of European Mobile Search Behaviour", Retrieved at << http://delivery.acm.org/10.1145/1410000/1409243/p13-church.pdf?key1=1409243&key2=2834414621&coll=GUIDE&dl=GUIDE&CFID=72554973&CFTOKEN=14719436>>, Proceedings of the 10th international conference on Human computer interaction with mobile devices and services, Sep. 2-5, 2008, pp. 13-22.

Church, et al., "Mobile Information Access: A Study of Emerging Search Behavior on the Mobile Internet", Retrieved at << http://delivery.acm.org/10.1145/1240000/1232726/a4-church.pdf?key1=1232726&key2=6084414621&coll=GUIDE&dl=GUIDE&CFID=72555792&CFTOKEN=84497527>>, ACM Transactions on the Web, vol. 1, No. 1, May 2007, pp. 1-38.

Guha, et al., "Serving Ads from Localhost for Performance, Privacy, and Profit", Retrieved at << http://adresearch.mpi-sws.org/privadworkshop.pdf>>, In Proceedings of Hot Topics in Networking (HotNets), Oct. 2009, pp. 6.

Kamvar, et al., "A Large Scale Study of Wireless Search Behavior: Google Mobile Search", Retrieved at << http://delivery.acm.org/10.1145/1130000/1124877/p701-kamvar.pdf?key1=1124877&key2=1195414621&coll=GUIDE&dl=GUIDE&CFID=72557603&CFTOKEN=48631247>>, CHI 2006 Proceedings • Search & Navigation: Mobiles & Audio, Apr. 22-27, 2006, pp. 701-709.

Kamvar, et al., "Deciphering Trends in Mobile Search", Retrieved at << http://www.maryamkamvar.com/publications/KamvarBalujaComputerMagazine.pdf>>, Computer, vol. 40, No. 8, Aug. 2007, pp. 36-40.

Kamvar, et al., "The Role of Context in Query Input: Using Contextual Signals to Complete Queries on Mobile Devices", Retrieved at << http://delivery.acm.org/10.1145/1380000/1378046/p405-kamvar.pdf?key1=1378046&key2=8765414621&coll=GUIDE&dl=GUIDE&CFID=72436322&CFTOKEN=24847593>>, Proceedings of the 9th international conference on Human computer interaction with mobile devices and services, Sep. 9-12, 2007, pp. 8.

Kamvar, et al., "Query Suggestions for Mobile Search: Understanding Usage Patterns", Retrieved at << http://www.esprockets.com/papers/chi2008.pdf>>, CHI 2008, Apr. 5-10, 2008, pp. 4.

Kamvar, et al., "Computers and iphones and mobile phones, oh my", Retrieved at << http://www2009.org/proceedings/pdf/p801.pdf>>, Proceedings of the 18th international conference on World wide web 2009, Apr. 20-24, 2009, pp. 801-810.

Markatos, et al., "A Top-10 Approach to Prefetching on the Web", Retrieved at << http://www.ics.forth.gr/carv/r-d-activities/ww-wPerf/INET98_prefetch/>>, Technical Report 173, ICS-FORTH, Aug. 1996, pp. 1-10.

"Mobile Local Search Ad Revenues to Reach $1.3B by 2013", Retrieved at << http://www.marketingcharts.com/interactive/mobile-local-search-ad-revenues-to-reach-13b-by-2013>>, The Kelsey Group's Mobile Local Media Forecast (2008-2013), Feb. 25, 2009, pp. 1-2.

"Monsoon Solutions", Retrieved at << http://www.msoon.com/LabEquipment/PowerMonitor>>, Jan. 22, 2010, pp. 1.

Nanopoulos, et al., "A Data Mining Algorithm for Generalized Web Prefetching", Retrieved at << http://ieeexplore.ieee.org/stamp/stamp.jsp?tp=&isnumber=&arnumber=1232270&tag=1>>, IEEE Transactions on Knowledge and Data Engineering, vol. 15, No. 5, Sep./Oct. 2003, pp. 1155-1169.

Padmanabhan, et al., "Using Predictive Prefetching to Improve World Wide Web Latency", Retrieved at << http://ccr.sigcomm.org/archive/1996/jul96/ccr-9607-mogul-padmanabhan.pdf>>, ACM SIGCOMM Computer Communication Review, vol. 26, No. 3, Jul. 1996, pp. 15.

Pitkow, et al., "Mining Longest Repeating Subsequences to Predict World Wide Web Surfing", Retrieved at << https://eprints.kfupm.edu.sa/50895/1/50895.pdf>>, Proceedings of USITS' 99: The 2nd USENIX Symposium on Internet Technologies & Systems Boulder, Oct. 11-14, 1999, pp. 13.

"Sony Ericsson Xperia X1a Mobile Phone", Retrieved at << http://www.sonyericsson.com/x1>>, Jan. 22, 2010, pp. 1-2.

Teevan, et al. "Information Re-Retrieval: Repeat Queries in Yahoo's Logs", Retrieved at << http://delivery.acm.org/10.1145/1280000/1277770/p151-teevan.pdf?key1=1277770&key2=5285414621&coll=GUIDE&dl=GUIDE&CFID=74245115&CFTOKEN=57614160>>, Proceedings of the 30th annual international ACM SIGIR conference on Research and development in information retrieval 2007, Jul. 23-27, 2007, pp. 151-158.

Teevan, et al. "Personalizing Search via Automated Analysis of Interests and Activities", Retrieved at << http://research.microsoft.com/en-us/um/people/sdumais/sigir2005-personalizedsearch.pdf>>, Proceedings of the 28th annual international ACM SIGIR conference on Research and development in information retrieval 2005, Aug. 15-19, 2005, pp. 8.

Yi, et al., "Deciphering Mobile Search Patterns: A Study of Yahoo! Mobile Search Queries", Retrieved at << http://www2008.org/papers/pdf/fp846-yi.pdf>>, WWW 2008, Apr. 21-25, 2008, pp. 257-266.

* cited by examiner

DYNAMIC COMMUNITY-BASED CACHE FOR MOBILE SEARCH

BACKGROUND

1. Technical Field

A "Community-Based Mobile Search Cache" provides various techniques for maximizing the number of query results served from a remotely constructed local "query cache" downloaded to mobile communications devices such as cell phones, PDAs, media players, etc., thereby limiting the need to connect to the Internet or cloud using 3G or other wireless links to service search queries entered by the user.

2. Related Art

The availability of Internet connections on mobile devices such as cell phones, PDA's, netbooks, notebooks, etc., allow users to easily access the web and their personal files stored in the cloud. However, Internet access using mobile devices often uses relatively expensive links such as 3G or other radio-frequency based networks, which often charge for that data link on a per-byte or per-time data transfer basis. Further, the limited resources (CPU, memory, bandwidth, etc.) that are often available on the mobile device together with the huge amount of information stored on the web/cloud makes the process of searching and quickly displaying the right piece of information on mobile devices a significant challenge. Consequently, a user entering a search query on her mobile device may desire a quicker and more focused search result than when entering the same query on that user's desktop computer with a high-speed wired connection to the Internet.

Many current state-of-the-art approaches to addressing such issues generally use the mobile device as a text input device for entering search queries. Users submit these search queries on their devices, which then transfer the query to the cloud/Internet through the 3G link (or other radio link). The cloud is then responsible for serving the queries and sending the results back to the mobile device through the 3G link. Unfortunately, this typical search architecture has at least two major drawbacks, including latency and power consumption.

In particular, when compared to a typical local network connection, the 3G or other radio link is slow. Therefore, establishing a connection with the cloud and exchanging information over the radio link takes time that negatively impacts user experience. In fact, mobile users are often on the go, and they both need and expect the results of their query as soon as possible. Further, on typical mobile devices, the radio link is one of the most power hungry components. Consequently, frequent or prolonged use of the radio link leads to faster draining of the mobile device's battery. Additionally, in a typical mobile environment, a radio link is not always available to the mobile device, thereby preventing the user from entering search queries for data or information in the cloud.

Several schemes have attempted to address some of these issues. For example, one conventional mobile search scheme attempts to reduce search time, or latencies, resulting from relatively slow data links used by many mobile devices by evaluating characters of a search term while they are being entered by the user. This mobile search scheme then continuously attempts to predict what the user query will be based on the characters that the user has entered so far, and uses each of the resulting predicted queries to download a predetermined number of search results to a local cache while the user is entering the query. Once the complete search term has been entered by the user, search results corresponding to the complete search term are displayed on the mobile device from the cache. This conventional scheme has two drawbacks. First, connecting and fetching data every time the user enters a character might not always be feasible due to the high latency of the 3G link. This can be especially true for mobile devices equipped with physical keyboards that enable the user to enter characters quickly. Second, this scheme might actually increase power consumption by requiring increased usage of the data link (3G, WiFi, etc.) to retrieve search results based on numerous predicted queries.

A somewhat related scheme addresses the idea of "data prefetching" in mobile environments for reducing search latencies. In general, this scheme determines the user's current location and automatically downloads location dependent data to the mobile device (e.g., restaurants, stores, phone numbers, etc.) within the general area surrounding the user's current location. As the user moves or changes location, this information is updated. In particular, information related to the user's current area is prefetched first, with closely related data being grouped together. Further, the user's direction of travel is considered such that if the user moves to the north, location-based data to the south is not prefetched since it is assumed that the user will not need the data related to areas behind him (i.e., south). As with the prior scheme, while this conventional scheme can reduce query result latencies on the mobile device, it will likely increase power consumption by requiring increased usage of the data link (3G, WiFi, etc.) to "prefetch" location-based data as the user moves about.

Another conventional scheme provides content caching for mobile devices by preemptively downloading popular multimedia content to those devices. In general, this scheme uses a "content selection algorithm" for push-based multimedia content caching scenarios. This scheme attempts to improve cache hit rates by exploiting correlations between users who request similar content (based on each user's multimedia content viewing history), with that information being used to select cache content on an individual user basis. Simpler versions of such schemes simply push the same set of the most popular multimedia content onto all connected mobile devices, with the limit on the amount of that content typically based on the available memory of the mobile device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Users of mobile communications devices such as cell phones, PDAs, netbooks, notebooks, etc., often use these mobile devices to search information while on the go by accessing one or more remote search engines or query search services (e.g., Bing™, Google®, Yahoo®, etc.) using a wireless link to the Internet, or some other cloud or network. In searching this information, the user generally enters a targeted and/or contextual search query into the mobile device. In general, a "Community-Based Mobile Search Cache", as described herein, provides various techniques for maximizing the number of query results served from a local "query cache", thereby significantly limiting the need to use 3G, WiFi, or other wireless radio links to connect the mobile device to the Internet, cloud, or network when entering search queries.

More specifically, in contrast to conventional mobile search schemes, the Community-Based Mobile Search Cache provides a local query cache of search results and/or related web pages for "popular" queries based on an evaluation of historical community queries. The content of the local query cache is determined by mining popular search queries from mobile search logs of a broader community of mobile devices. This data mining is periodically performed either on a global basis (i.e., using the search history of all users of mobile devices), or based on the search queries of one or more groups or subgroups of users (typically numbering in the thousands or millions) for the purpose of periodically updating the query cache.

Deterministic or probabilistic caching of popular results and/or related web pages based on this data mining allows the Community-Based Mobile Search Cache to immediately return search results and/or web pages to the user from the local query cache without requiring the mobile device to access the Internet or cloud using its 3G or other wireless connection. It is also important to understand that the query cache is generally not being searched to identify matches to user-entered queries, but rather that that the query cache is already indexed, complete with rankings for the search results of a large set search terms at the time the query cache is created. However, in various embodiments, some or all of the search results are re-ranked based on a variety of factors as discussed in further detail herein.

The set of popular queries and web pages mined from the broader community of mobile devices changes over time. Consequently, in various embodiments, the local query cache is periodically updated to make sure that the most up-to-date information is available locally on the mobile device. The Community-Based Mobile Search Cache will periodically (e.g., hourly, daily, weekly, etc.) mine the search logs to identify the latest set of popular queries and web pages. The periodically updated local query cache is downloaded to mobile devices on demand, preferably, though not necessarily, at a time that will reduce or eliminate the need for the mobile device to use 3G, WiFi, or other wireless links during the download process. For example, in various embodiments, the local query cache can be downloaded to the user's desktop, laptop, notebook, or netbook computer via a typical Internet or network connection, which is then "synched" or otherwise copied to the mobile device to transfer or update a current copy of the query cache on the mobile device.

Over time, in various embodiments, the Community-Based Mobile Search Cache locally monitors the queries entered as well as the search results clicked by the individual user, and performs two discrete tasks. First, it expands the local query cache to include all those queries and search results accessed by the user that do not initially exist in the community part of the local query cache. In that way, the local query cache can take advantage of the repeatability of the queries submitted by the mobile users to serve as many queries as possible locally on the mobile device. Second, it collects information about user clicks, such as when and how many times the user clicks on a link after a query is submitted, to customize ranking of search results to the user's click history.

In various embodiments, the local query cache downloaded to the mobile devices of specific users, or to particular "groups" or "communities" of users, is customized based on any of a variety of factors. These factors include, but are not limited to, geographic region of the user, age and/or gender of the user, language of the user, user browsing or search histories, the contents of electronic calendars or other electronic documents maintained on a particular mobile device, etc. In various embodiments, these factors are used in at least two different ways. First, to identify which queries should be included in the local query cache. Second, these factors are considered in various embodiments to re-rank search results returned by the Community-Based Mobile Search Cache. In general, re-ranking of search results ensures that information that may be more relevant to the user will be ranked higher, and thus displayed higher on the list of search results returned by the Community-Based Mobile Search Cache in response to the user query.

Some of the advantages of the local query cache provided by the Community-Based Mobile Search Cache are that search accuracy and search result rankings are preserved (relative to either the original search results being mined or to the community "popularity" of those results based on aggregate link volume), thereby precluding the need to maintain a search index on the mobile device. In fact, in most embodiments, ranking does not generally run on the mobile device, since when results are presented to the user, they are simply presented in the order in which they would have been returned from the original search index (retrieved by mining community search logs, as noted above). However, if those results have been re-ranked, as noted above, the results are instead displayed based on their new rankings.

In view of the above summary, it is clear that the Community-Based Mobile Search Cache described herein provides various techniques for maximizing the number of query results served from a remotely constructed local "query cache", thereby significantly limiting the need to connect to the Internet or cloud using 3G or other wireless links to service search queries. In addition to the just described benefits, other advantages of the Community-Based Mobile Search Cache will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
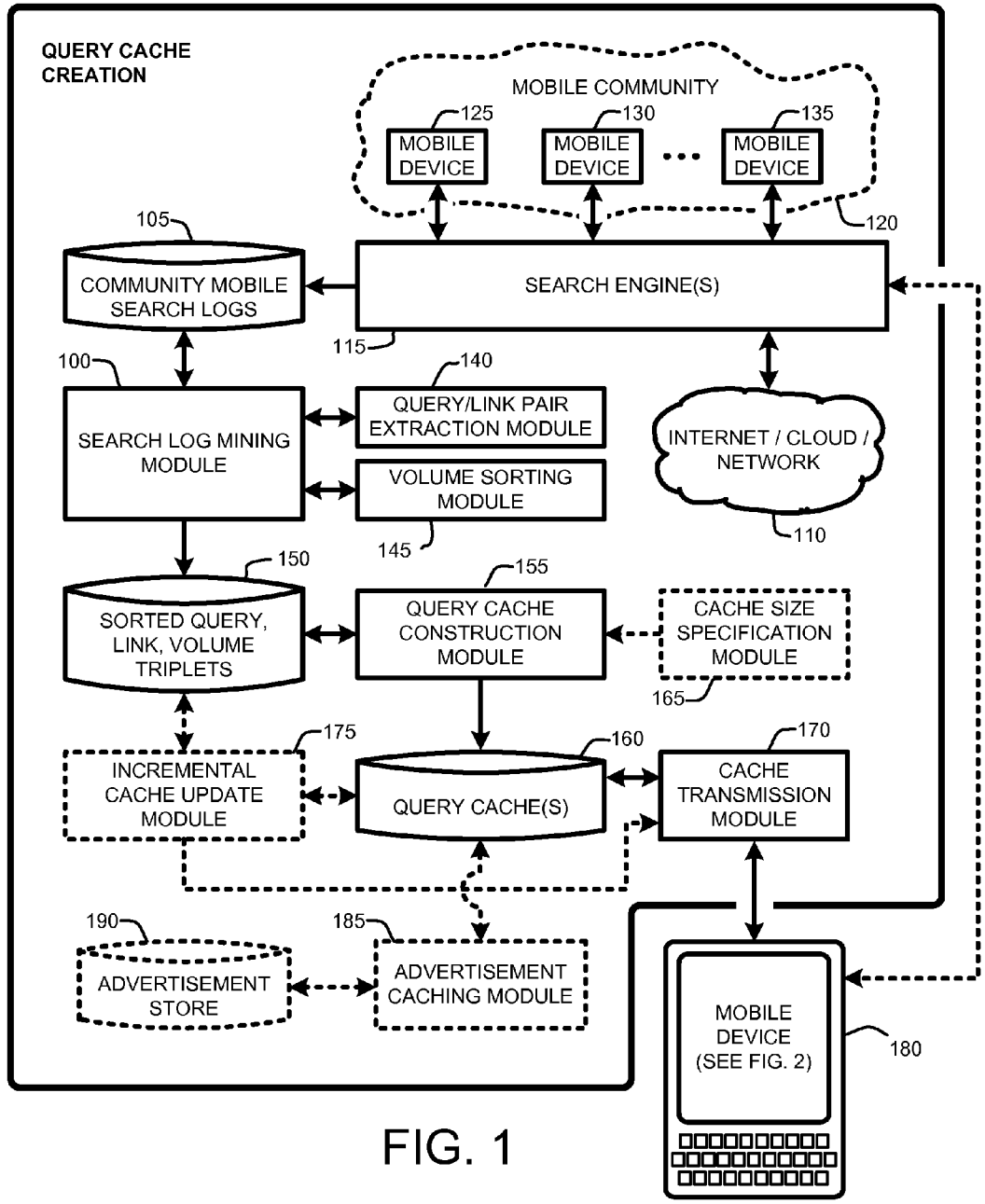
FIG. 1 illustrates a general flow diagram for constructing and providing a community-based query cache to one or more mobile devices for use in implementing a "Community-Based Mobile Search Cache," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Community-Based Mobile Search Cache," as described herein, provides various techniques for maximizing the number of query results served from a local "query cache", thereby significantly limiting the need for mobile communications devices to use 3G, WiFi, or other wireless radio links to connect to the Internet, cloud, or other network when entering search queries. In other words, the Community-Based Mobile Search Cache uses a cache-based architecture to locally serve search queries by using the query cache on mobile communications devices such as cell phones, PDA's, netbooks, notebooks, etc.

For example, users of mobile communications devices often use these devices to search information while on the go by accessing one or more remote search engines or query search services (e.g., Bing™, Google®, Yahoo®, etc.) using a wireless link to the Internet, or some other cloud or network. In searching this information, the user often enters a targeted and/or contextual search query into the mobile device. In contrast to conventional mobile search schemes, the Community-Based Mobile Search Cache provides a local query cache of search results and/or related web pages for popular queries based on an evaluation of historical community queries. The content of the local query cache is determined by mining popular search queries from mobile search logs of a broader community of mobile devices. Periodic updating of the query cache is achieved by periodically performing the data mining, either on a global basis (i.e., search history of all users of mobile devices), or based on the search queries of one or more groups or subgroups of users (typically numbering in the thousands or millions). In various embodiments, search queries submitted by individual users are monitored and used to personalize the query cache for those users.

The size of the query cache provides a space constraint that is used when mining the mobile search logs to decide which part of the search logs is the most appropriate to be stored so that the number of search queries that are locally served is maximized. Note that in various embodiments, query cache size can be determined on an individual user basis, can be set at user specified levels, or can be constructed in various sizes that are either automatically selected or selected by the user for download to the users' mobile device. In various embodiments, whenever a search query is associated with sufficiently high probability to a specific web page contained in the query cache, the Community-Based Mobile Search Cache automatically displays that web page to the user immediately without first displaying the search results in response to the query input by the user.

1.1 System Overview:

As noted above, the "Community-Based Mobile Search Cache," provides various techniques for various techniques for maximizing the number of query results served from a remotely constructed local "query cache", thereby significantly limiting the need to connect to the Internet or cloud using 3G or other wireless links to service search queries. The processes summarized above are illustrated by the general system diagram of FIG. 1.

In particular, the system diagram of FIG. 1 illustrates the interrelationships between program modules for implementing various embodiments of the Community-Based Mobile Search Cache, as described herein. Furthermore, while the system diagram of FIG. 1 illustrates a high-level view of various embodiments of the Community-Based Mobile Search Cache, FIG. 1 is not intended to provide an exhaustive or complete illustration of every possible embodiment of the Community-Based Mobile Search Cache as described throughout this document.

In addition, it should be noted that any boxes and interconnections between boxes that may be represented by broken or dashed lines in FIG. 1 represent alternate embodiments of the Community-Based Mobile Search Cache described herein, and that any or all of these alternate embodiments, as described below, may be used in combination with other alternate embodiments that are described throughout this document.

In general, as illustrated by FIG. 1, the processes enabled by the Community-Based Mobile Search Cache begin operation by using a search log mining module 100 to extract data from one or more community mobile search logs 105. As discussed in further detail in Section 2.1 and Section 2.2, the community mobile search logs 105 include records of search queries with corresponding search results and user link selection information derived from one or more search engines 115 interacting with a community of mobile devices (i.e., mobile community 120). In other words, the mobile community 120 includes a plurality of mobile devices (e.g., mobile devices 125, 130, 135), typically numbering in the thousands or millions of users, that submit queries to the search engines 115 which interact with the Internet, cloud, or network 110 to retrieve or return search results. These queries along with the results of those queries (i.e., returned links and user selection of one or more of those links) are recorded or stored in one or more databases referred to herein as the aforementioned community mobile search logs 105.

As discussed in further detail in Section 2.1 and Section 2.2, mining of the community mobile search logs 105 by the search log mining module 100 involves examining the information contained in those logs using a query/link pair extraction module 140 to extract pairs of queries and corresponding links returned by the search. For example, using the Bing™ search engine to enter the query term "space shuttle" returns a large number of links, including, for example, "www.nasa.gov/mission_pages/shuttle/main/index.html", "en.wikipedia.org/wiki/space_shuttle", "www.space.com/space-shuttle", etc. Thus, the query term "space shuttle" when coupled with any of these returned links represents a "query/link pair". Once the query/link pair extraction module 140 has extracted the available query/link pairs from the community mobile search logs, a volume sorting module 145 sorts these query/link pairs based on the aggregate volume associated with each query/link pair to construct a set of query, link, volume triplets 150 (i.e., query/link pairs with either an associated click-through volume or a volume-based "score"). In other words, the "volume" of these triplets 150 represents the total number of instances in the mobile community 120 that a particular link was selected in response to a particular query. Note that any particular user might search for the same thing more than once. See Table 1 in Section 2.2 for an example of query, link, volume triplets.

Next, a query cache construction module 155 evaluates the sorted query link, volume triplets 150 to determine which part of the community mobile search logs 105 is the most appropriate to be stored so that the number of search queries that are locally served is maximized. In particular, as discussed in further detail in Section 2.2, the query cache construction module 155 selects a subset of links having the highest aggregate volume along with the query terms associated with the corresponding triplets to construct one or more query caches 160. Note that as described in Section 2, in various embodiments, the Community-Based Mobile Search Cache makes use of a hash table data structure for linking queries to search results. In this case, the hash table (not shown) is constructed along with the query cache by the query cache construction module 155 and is then maintained locally (on each mobile device) separate from the query cache (also maintained locally on each mobile device).

Note that it is expected that different mobile devices (or user requirements or specifications) will allow for query caches 160 of different sizes (i.e., available memory or storage allocated to the query cache). Therefore, in various embodiments, a cache size construction module 165 is used to determine the number of query/link pairs that are included in the query cache for particular mobile devices or users or groups of mobile devices or users. In other words, depending upon the space available, the query cache construction module will select the first n unique links (and paired queries) that fit in the cache (given the space allocated for the query cache 160) from the sorted query link, volume triplets 150. Again, as noted above, the "volume" portion of these triplets is either actual aggregate volume, or a volume-based "score" (i.e., a "ranking score") as discussed in Section 2.2. The selected query/link pairs are then used to construct the query cache 160.

Note also that as discussed in further detail in Section 2.1.1, in various embodiments, various versions of the query cache 160 are constructed based on various criteria, including community mobile search logs 105 of particular users or particular groups of users, logs derived from particular geographic regions or languages, etc. As such, it should be understood that the query cache construction module 155 is capable of creating a plurality of different versions of the query cache 160 that can then be transmitted to, or selected by, individual users or mobile devices.

In addition, as discussed in further detail in Section 2.4, in various embodiments, additional content, such as, for example, individual documents, advertisements, web pages, or even entire web sites, are cached and stored with, or accessible with, the query cache 160. Since web pages or documents generally require more storage space than the sorted query link, volume triplets 150, the amount of this additional content is also limited by the available storage space, as defined or specified by the cache size specification module 165.

A query cache transmission module 170 then transmits the query cache 160 to individual mobile devices 180 for local use by those devices. Note that while only one mobile device 180 is illustrated in FIG. 1 for purposes of explanation, in operation of the Community-Based Mobile Search Cache, it is assumed that many thousands or millions of mobile devices will receive a copy of a query cache 160 (though not necessarily the same copy) for local use. Note also that while the query cache 160 can be directly transmitted to the mobile device 180 on demand, the query cache is preferably, though not necessarily, transmitted to the mobile device at a time that will reduce or eliminate the need for the mobile device to use 3G, WiFi, or other wireless links during the download process.

For example, in various embodiments, the query cache 160 is downloaded to the user's desktop, laptop, notebook, or netbook computer via a typical Internet or network connection. The query cache 160 is then "synched" or otherwise copied to the mobile device to transfer or update a current copy of the query cache on the mobile device. The mobile device 180 is then capable of performing local "searches" using the downloaded copy of the query cache 160. However, it should also be understood that the mobile device 180 can still perform conventional searches and the like by accessing one or more remote search engines 115 or other remote databases (not shown) to retrieve information from the Internet, cloud, or network 110.

Further, in various embodiments, an incremental cache update module 175 is used to provide incremental update information to the mobile device 180 via the cache transmission module 170. As with the query cache 160, in various embodiments, the incremental update information can also be downloaded to the user's desktop, laptop, notebook, or netbook computer via a typical Internet or network connection, which is then "synched" or otherwise copied to the mobile device 180 to update the copy of the local query cache on the mobile device.

Finally, in various embodiments where advertisements are cached and stored with, or accessible with, the query cache 160, an advertisement caching module 185 is used to select a set of advertisements from an advertisement store 190 based on any desired advertisement selection and/or advertisement billing mechanism. Selected advertisements are then included in or with the query cache, as noted above. As discussed below, one or more cached advertisements are then presented to the user in various embodiments based on various conventional techniques for matching particular advertisements to user entered queries.

Figure 2:
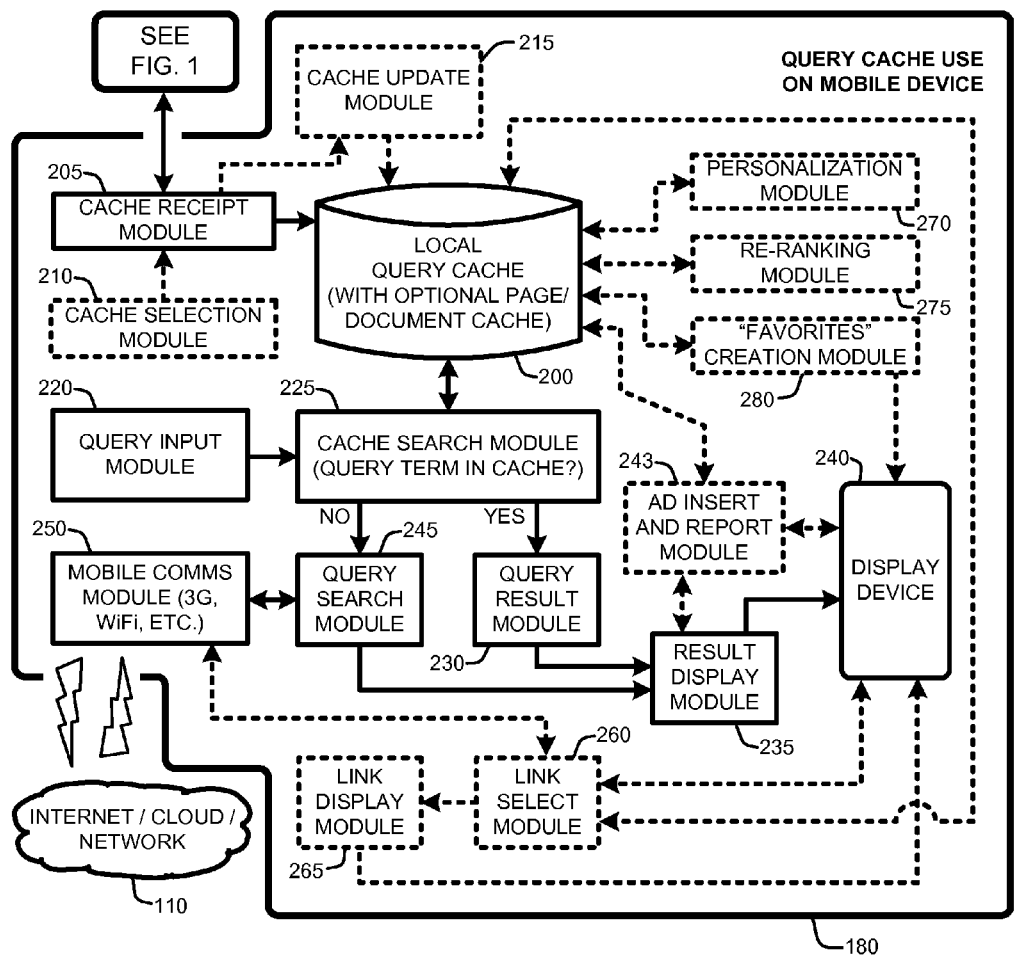
FIG. 2 provides an exemplary flow diagram that illustrates program modules for implementing various embodiments of receiving, using, and updating the community-based query cache of FIG. 1 on an individual mobile device, as described herein.

FIG. 2 illustrates the interrelationships between program modules for implementing various embodiments of the Community-Based Mobile Search Cache within a particular mobile device, as described herein. Furthermore, while the system diagram of FIG. 2 illustrates a high-level view of various embodiments of the Community-Based Mobile Search Cache, FIG. 2 is not intended to provide an exhaustive or complete illustration of every possible embodiment of the Community-Based Mobile Search Cache as described throughout this document. In addition, it should be noted that any boxes and interconnections between boxes that may be represented by broken or dashed lines in FIG. 2 represent alternate embodiments of the Community-Based Mobile Search Cache described herein, and that any or all of these alternate embodiments, as described herein, may be used in combination with other alternate embodiments that are described throughout this document.

In general, the system diagram of FIG. 2 builds on FIG. 1 by illustrating various embodiments showing how the query cache 160 of FIG. 1 is received, used, and/or updated within an individual mobile device 180. Note that the query cache 160 generated as illustrated by FIG. 1 may be locally modified or updated due to various local conditions or actions on the mobile device 180. Consequently, the query cache 160, once received by the mobile device of FIG. 2, is referred to as a "local query cache 200" to differentiate the local copy of the query cache from the remote copy of the query cache 160 constructed as illustrated by FIG. 1.

More specifically, as illustrated by FIG. 2, the mobile device 180 receives the query cache 160 (or query cache update information, as described above with respect to FIG. 1) transmitted by the cache transmission module 170 of FIG. 1. This information is received by the mobile device 180 via a cache receipt module 205 using conventional communications protocols and methods. The mobile device 180 then stores the received copy of the query cache 160 as the local query cache 200. In the case of receiving cache update information rather than a complete query cache, a cache update module 215 is used to integrate that information into the local query cache 200.

Further, as discussed above with respect to FIG. 1, multiple versions of the query cache 160 may be created based on various criteria, including community mobile search logs 105 of particular users or particular groups of users, logs derived from particular geographic regions or languages, etc. As such, in various embodiments, a cache selection module 210 is provided on the mobile device 180 to allow the user (or mobile device) to select one or more of the different versions of the query cache 160 for use as the local query cache 200. A simple example of this concept is that a user in Paris, France that intends to travel to New York City may want to select a copy of the query cache 160 derived from community mobile search logs 105 generated by mobile devices in New York City for use as the local query cache 200 on that user's mobile device 180.

Regardless of whether a particular query cache (element 160 of FIG. 1) is selected for the local query cache 200, once the selected query cache has been received by the mobile device 180, user queries entered on the mobile device are serviced locally using the local query cache. More specifically, a query input module 220 is used to enter a query string or search term (similar to the entry of a query term in any conventional browser). A cache search module 225 then examines the local query cache 200 to determine whether the subject query term exists in the local query cache. If that query term does exist in the local query cache 200, a query result module 230 synthesizes or constructs one or more results pages (see Section 2.6) based on the content of the local query cache with respect to the query term.

In other words, as discussed in further detail throughout Section 2 of this document, the local query cache 200 does not include copies of actual search results pages, but rather, it stores a ranked list of links and associated query terms mined from the results of the original community mobile search logs (element 105 of FIG. 1). Note that in various embodiments, the ranking information is maintained in a separate hash table (not shown), as discussed in Section 2. These links and associated query terms, when retrieved from the local query cache 200 are then automatically formatted by the query result module 230 and used to locally (i.e., on the mobile device) synthesize or construct one or more "search result" pages. A result display module 235 then presents the synthesized search results page(s) to the user via a conventional display device 240 that is integral (or coupled to) the mobile device 180.

Further, as noted above, in various embodiments, advertisements may also be cached in or along with the query cache. In the case of advertisements, as discussed in further detail in Section 2.5, various advertisements that are related to the content in the local query cache are included in, or in conjunction with, the local query cache 200. In addition, in various embodiments, an ad insert and report module 243 is capable of contacting a remote server to download one or more relevant advertisements in real-time for presentation to the user. In either case, the Community-Based Mobile Search Cache can display one or more relevant ads to the user as he types a query by using the ad insert and report module 243 to select relevant advertisements (either cached or from one or more remote sources) and incorporate them into the search results page constructed by the query result module 230. For example, for every possible keyword that the user might enter, the Community-Based Mobile Search Cache can instantly retrieve and display an advertisement about a business near the location of the user that is related to this keyword. However, it should be understood that criteria other than user location can also be used for selection of advertisements to be displayed to the user (see Section 2.5).

Finally, in various embodiments, the ad insert and report module 243 also keeps track of advertisements that are either presented to the user and/or selected by the user. This advertisement presentation and selection information is then periodically reported back to a remote server by the ad insert and report module 243 for advertiser billing purposes. In other words, this periodically reported information allows advertisers to be billed on a per placement, per impression and/or per-selection basis for advertisements presented to the user by the Community-Based Mobile Search Cache.

It should also be understood that the use of the local query cache 200 by the mobile device 180 is generally transparent to the user. In other words, the result page(s) presented to the user on the display device 240 will appear to the user to be the same as if the user had entered the query via a conventional search engine that then polled or accessed a remote database to return results to the user. In fact, in various embodiments, the search engine being used on the mobile device 180 is simply modified to access the local query cache 200 directly instead of transmitting the query string for remote handling as with conventional search engine usage. Alternately, in various related embodiments, the operating system includes an interrupt or the like that watches for a user query string entered into any conventional search engine, and then causes the query string to be handled locally via the aforementioned cache search module 225, as described above, with the results then being returned to that search engine. Further, in various embodiments, the results page(s) synthesized by the query result module 230 are identified as having been synthesized from the local query cache 200 so that the user is fully aware of where those results came from.

In the case that the query term entered via the query input module 220 does not exist in the local query cache 200, a query search module 245 simply performs a conventional search by using a mobile communications module 250 to access the internet, cloud, or network 110 to perform that search. The results of the conventional search are then returned to the query search module 245. The query search module 245 then simply passes those results to the result display module 235, which then presents the downloaded search results to the user via the conventional display device 240.

In either case, once the search results have been presented to the user via the display device 240, the user can browse or select any of the links presented in those results in the same manner as with a results page returned by any conventional search engine. In particular, a link select module 260 allows the user to select any of the links being displayed on the display device 240. As noted above, in various embodiments, the Community-Based Mobile Search Cache stores or caches additional content, such as, for example, individual documents, web pages, or even entire web sites, either in the local query cache 200, or in a separate file or database (not shown in FIG. 2) that is accessible to the Community-Based Mobile Search Cache.

Therefore, in various embodiments, once a link has been selected, the link select module 260 first checks the local query cache 200 (or the associated file or database of additional content) to determine whether the page or document corresponding to the selected link is stored locally. If that information is stored locally, then the link select module 260 forwards that information to a link display module 265, which then presents the information corresponding to the selected link to the user via the display device 240. If the information (i.e., web page, document, etc.) corresponding to the selected link is not stored locally, then the link select module 260 passes the selected link to the mobile communications module 250. The mobile communications module 250 then retrieves the information corresponding to the selected link from the internet, cloud, or network 110. The retrieved information is then returned to the link select module 260. The link select module 260 then passes the information to the link display module 265, which then presents the information corresponding to the selected link to the user via the display device 240.

Further, in various related embodiments where the information (i.e., web page, document, etc.) corresponding to the selected link is stored locally (on mobile device 180), whenever a search query is associated with a sufficiently high probability of click-through to a specific web page (based on the aforementioned data mining), the corresponding web page is immediately displayed to user without first displaying the search results via the result display module 235.

As noted above, in various embodiments, the local query cache 200 is locally customized, modified, or updated due to various local conditions or actions on the mobile device 180, including, but not limited to user browsing or search histories, the contents of electronic calendars or other electronic documents maintained on a particular mobile device, etc. (see Section 2.3 and 2.4). This type of personalization or customization is performed by a personalization module 270. In general, the personalization module adds, removes, or re-scores links in the local query cache 200 in response to user interaction with the local query cache over time. For example, in various embodiments, a local data store accessible to the mobile device 180 including one or more documents, emails, calendars, etc., is scanned to extract names, dates, places, or other information corresponding to one or more query terms in the query cache. Links to these documents emails, calendars, etc., are then included in the local cache 200. Then, when the user enters a corresponding query term, links to the locally available information will be included in the results presented to the user on the display device 240, as described above.

In partially related embodiments, similar factors are considered in various embodiments to re-rank search results returned by the Community-Based Mobile Search Cache (see Section 2.3.1 for a discussion of personalized re-ranking). In general, a re-ranking module 275 re-ranks search results in the local query cache 200 to ensure that information that may be more relevant to the user of the mobile device 180 will be ranked higher. More specifically, as discussed in Section 2.3.1, by monitoring user queries and clicks over time, the Community-Based Mobile Search Cache is aware of when and how many times the user selects a link after a given query is submitted. The Community-Based Mobile Search Cache uses this information to incrementally update the ranking score of the cached search results to offer a personalized search experience to individual users. As such, results that are more relevant are displayed higher on the list of search results displayed on the display device 240 by the result display module 235 in response to the user query.

Finally, in yet another embodiment, the local query cache 200 is periodically evaluated by a "favorites" creation module 280 to extract a set of the highest probability links to automatically create a list of favorite links that are presented to the user as simply a list of favorites or the like. For example, while the list of favorites can be any length desired, some number (e.g., 15 links) of the most frequently selected unique links (based on the aforementioned query, link, volume triplets) are simply presented to the user as a user selectable list. This list is presented to the user via the display device 240, with user selection of these links being handled as described above. In various embodiments, this list of favorites is user editable, has a user selectable size, and can be displayed to the user on demand via user selection of a favorites button, a favorites menu item, etc.

2.0 Operation of the Community-Based Mobile Search Cache:

The above-described program modules are employed for implementing various embodiments of the Community-Based Mobile Search Cache. As summarized above, the Community-Based Mobile Search Cache provides various techniques for maximizing the number of query results served from a remotely constructed local "query cache", thereby significantly limiting the need for mobile devices to connect to the Internet or cloud using 3G or other wireless links to service search queries.

The following sections provide a detailed discussion of the operation of various embodiments of the Community-Based Mobile Search Cache, and of exemplary methods for implementing the program modules described in Section 1 with respect to FIG. 1 and FIG. 2. In particular, the following sections provide examples and operational details of various embodiments of the Community-Based Mobile Search Cache, including: search log mining; constructing the query cache; result page construction; customizing the query cache; synthesizing search results pages; re-ranking search results in the query cache; and automatic bookmark or "favorites" creation.

2.1 Search Log Mining:

As noted above, the Community-Based Mobile Search Cache makes use of a query cache that is derived from mobile search logs of a broader community of mobile devices. In examining typical mobile search logs from large numbers of users, it has been observed that a relatively small number of queries and links from a set including millions of actual mobile searches can be considered as being "highly popular". In other words, a relatively small set of mobile searches correspond to a significant percentage of the most common mobile searches.

Figure 3:
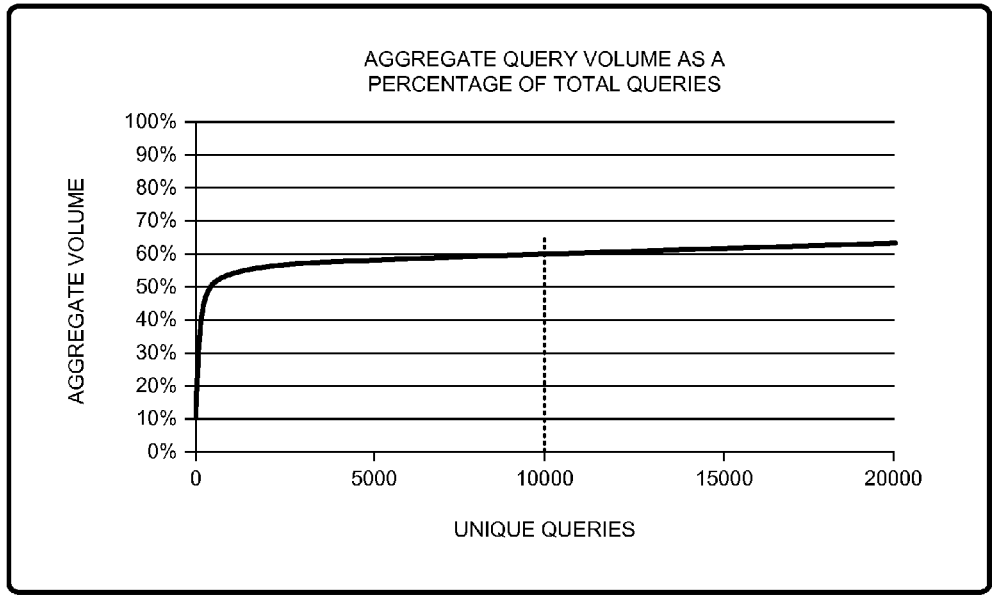
FIG. 3 provides an example of a graph of real world data showing aggregate query volume as a percentage of total queries, derived from a record of queries and search results of a community of mobile devices, as described herein.

For example, in a tested embodiment of the Community-Based Mobile Search Cache, a database of actual mobile search logs comprising about 100 million queries to a conventional search engine was recorded over an approximately three month period. This database of community-based mobile search logs was analyzed to determine query, link, and volume triplets (i.e., query/link pairs with associated volume) for every mobile query processed and recorded by the search engine. As illustrated by FIG. 3, it was observed that more than 60% of the aggregate mobile search query volume during this period corresponded to as few as 10,000 unique queries. Similarly, as illustrated by FIG. 4, it was observed that more than 60% of the aggregate link volume (e.g., click-through from search results, entering hyperlinks directly, etc.) during this same period corresponded to as few as 6,000 unique hyperlinks or web pages.

Consequently, in view of these examples of real-world data, it was determined that high cache hit rates could be achieved by using a local cache of a relatively small subset of the total community-based mobile search logs. Therefore, the Community-Based Mobile Search Cache mines the mobile search logs to decide which part of the search logs is the most appropriate to be stored so that the number of search queries that are locally served is maximized. Note that the query cache size can be a function of available or allocated space (e.g., available local memory or storage) for particular mobile devices, and that different query cache sizes can be used for particular mobile devices. Further, it should also be clear that in view of FIG. 3 and FIG. 4, beyond some easily determinable point, relatively little will be gained in terms of cache hit rates by increasing the size of the query cache (with respect to caching queries and links). In fact, various tested embodiments of the Community-Based Mobile Search Cache showed consistent positive cache hit rates when using the query cache on the order of about 60% when using a query cache of about 32 MB in size. Therefore, since typical mobile devices, such as cell phones, PDA's, netbooks, notebooks, etc., generally include many gigabytes of local storage, the query cache generally requires a negligible amount of that available storage.

Figure 4:
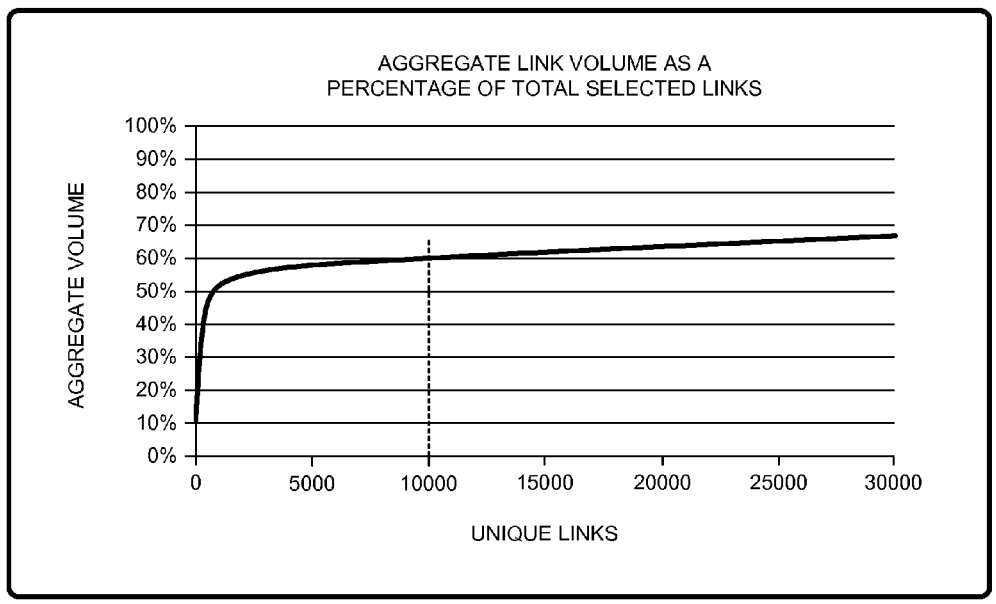
FIG. 4 provides an example of a graph of real world data showing aggregate link volume as a percentage of total selected links, derived from a record of queries and search results of a community of mobile devices, as described herein.

However, while relatively large increases in the storage of additional queries and links in the query cache may not significantly increase cache hit rates beyond some point (as can be seen by FIG. 3 and FIG. 4), additional storage space, if available for the query cache, can be used to cache documents, web pages or even entire web sites. For example, over relatively short time periods, e.g., hours, days or even weeks, many highly popular search results can be considered "static". In other words, much of the content of the Internet is relatively unchanging or consistent, even for time-sensitive and dynamic web content, when considered in the short term. Clearly, this will not be the case for real-time content such as live stock quotes. However, some content (e.g., web pages or documents) such as, for example, daily news reports, blogs, weather reports, historical stock quotes or charts, maps, restaurant guides, etc., can be considered "static" within the lifetime of the query cache (i.e., the period between updates of the query cache).

Therefore, in various embodiments, as discussed in further detail in Section 2.4, a set of one or more relatively "static" web pages (selected on the basis on their aggregate link volume determined by mining the mobile search logs) are included in the query cache (or in a separate data set locally available to the Community-Based Mobile Search Cache). In other words, in various embodiments, a set of one or more web pages (or documents) having the highest probability of being viewed by the user are included in the local query cache (or a separate database or data set accessible to the Community-Based Mobile Search Cache. These documents or web pages are then served locally in response to user selection of a corresponding link. As such, the mobile device is not required to connect to the Internet or cloud using 3G or other wireless links to service corresponding search queries entered by the user.

2.1.1 Customized Mining for Individual Users or Groups:

In various embodiments, the query cache is customized on a per-user, per-device, or per-group basis. For example, in the case of per-user query cache customization, various factors can be considered such as user locality or geographic region, user language, prior user search logs, user "community", etc. Given these types of considerations, the local query cache for individual users is then customized based on "groups" of similar users.

For example, in the case of geographic region, the most popular mobile searches in New York City may differ significantly from the most popular mobile searches in Houston, Tex. Therefore, if the location of the mobile device can be located within a particular region using GPS, user input, or other conventional localization techniques, including using the locations of cell towers or WiFi sites that the mobile device is connected to, a local query cache corresponding to popular searches in that region can be uploaded to the mobile device. Note also that since the query caches are constructed from relatively large data sets (i.e., many queries and many users), a user interface is provided in various embodiments to allow the user to select one or more particular local query caches for download to the mobile device. In other words, in various embodiments, the user is provided with the capability to select one or more query caches from a set of available query caches corresponding to particular regions, languages, groups, etc.

In the case of per-device customization, one important consideration is memory allocated or available for the local query cache. Specifically, as the available memory is increased, more information, including search results, hyperlinks, web pages, images, etc., can be included in the local query cache. Consequently, in various embodiments, multiple query caches are constructed using a range of maximum memory requirements, with a query cache of the appropriate size then being downloaded to particular mobile devices. Note that in various embodiments, the user is provided with the capability to set maximum and/or minimum sizes for the query cache.

2.2 Constructing the Query Cache:

As noted above, the query cache is constructed by mining popular search queries from mobile search logs gathered from the query history of a broader community of mobile devices. In general, every query in these logs includes a generally very large set of ranked matches (generally in the form of an ordered list of hyperlinks that typically include brief content summaries) for the particular user query that spawned the corresponding log entry. Further, user selection or entry of one or more of those hyperlinks is also recorded along with the original query. This provides a measure of query/link pairs that is used to generate a ranked list of links for each query term based on actual link selection by the community (i.e., aggregate link volume for a particular query term, as illustrated by FIG. 3 and FIG. 4) rather than merely the rankings provided by the search engine.

As is well known to those skilled in the art, query result pages and corresponding user selections are typically automatically provided, and permanently recorded, as an inherent part of the search process, regardless of the particular search engine being used (e.g., Bing™, Google®, Yahoo®, etc.). By recording all of this information for all mobile searches (or for particular groups or subgroups of users of mobile devices), volume measurements for both query terms and hyperlink selection are also inherently available via mining of the mobile search logs.

Therefore, as noted above, the mobile search logs can be mined to extract a subset of the available information for use in constructing the query cache. Note that in many cases, search results returned from a particular query point to the same web page or document in the case that the same web page was found or indexed by different paths. Therefore, in order to further reduce the size of the query cache, in various embodiments of the Community-Based Mobile Search Cache, these "duplicate" results are removed when constructing the query cache. However, it should be understood that where different mobile users selected different search results pointing to the same web page or document, those individual selections will still be counted for purposes of aggregate link volume for the particular link.

For example, in a tested embodiment, the Community-Based Mobile Search extracted query, link, volume triplets from the mobile search logs and sorted them in descending order (of aggregate volume). Given this information, the first n unique links that fit in the cache (given the space allocated for the query cache) are then used to construct the query cache along with a set of the most popular query terms associated with those links.

More specifically, the search results stored in the query cache are extracted directly from the mobile search logs in a data-driven way that acts to identify the most popular queries and search results that are of interest to the whole mobile community. Table 1 shows a hypothetical example of the type of information extracted from the search logs. A set of triplets of the form: <query, link, volume> is generated and sorted based on volume. The term query corresponds to the exact query string submitted to the search engine, the term link corresponds to the search result that was selected by a mobile user after entering the particular query, and the term volume represents the number of times in the search logs that the specific link was selected after entering the query string query. For instance, the first data row in Table 1 can be interpreted as follows: Over the period that the mobile search logs were recorded, there were 1 million searches where the link "http://mobile.myspace.com" was selected after the query "myspace" was submitted.

TABLE 1

Example of Query-Link-Volume Triplets

| Query | Link | Volume |
|---|---|---|
| myspace | http://mobile.myspace.com | 1,000,000 |
| myspace | http://www.myspace.com | 950,000 |
| facebook | http://m.facebook.com | 900,000 |
| ... | ... | ... |
| youtube | http://m.youtube.com | 500,000 |
| yotube | http://m.youtube.com | 300,000 |
| ... | ... | ... |
| weather | http://m.weather.com | 200,000 |
| ... | ... | ... |
| Total Volume | | 100,000,000 |

Deciding which entries to store is straightforward. To maximize the query volume that can be served by the local query cache, the most popular query-link pairs are stored. In other words, the selected entries represent a subset drawn from the top entries of Table 1 (based on volume). The higher the volume of a query-link pair, the higher the probability that a given user will try to access this query-link pair on his mobile device. Deciding how many of the most popular query-link pairs to store is a more complicated process. In this case, the number of query-link pairs to cache is selected based on either a "memory threshold" (i.e., a maximum or allowable memory or storage space) or "cache saturation threshold".

First, with respect to the use of a memory threshold, in various embodiments, the local query cache is held in local memory (i.e., local flash or RAM memory). In this case, a memory threshold ($M_{th}$) limits the number of query-link pairs that are to be cached. For example, in this case, starting from the top entry in Table 1, the Community-Based Mobile Search Cache simply scans down through the entries and continuously adds query-link pairs to the local query cache until a specific flash or RAM memory threshold $M_{th}$ is reached. This threshold represents the maximum memory that can be allocated to local query cache. As noted above, various mobile devices will have differing memory capacities (either physical or allocated limits). These memory capacities can be set by either the mobile device itself based on its available memory resources, or by the user depending on how much storage space and memory the user is willing to allocate to the local query cache. In either case, the copy of the local query cache transmitted to any particular mobile user will not exceed the memory threshold for that user. Assuming a relatively consistent size for query-link pairs and links, the memory and storage requirements can be easily computed for a given set of entries (such as those seen in Table 1) based on the number of unique queries and links they contain.

Next, with respect to the aforementioned "cache saturation threshold", this concept is used populate the local query cache by starting from the top entry in Table 1, then running down though its entries and continuously adding query-link pairs until a query-link pair is reached with a "normalized volume" lower than a predetermined threshold $V_{th}$. The "normalized volume" of a query-link pair is generated by dividing the pair's volume by the total volume of all query-link pairs in the search logs. For instance, the normalized volume of the first query-link pair in Table 1 is equal to: $10^6/10^8=0.01$. Since the entries in Table 1 are sorted based on their volume, the normalized volume of query-link pairs is monotonically decreasing. Note that $V_{th}$ can be set at any desired level. However, as $V_{th}$ is decreased, the size of the cache will tend to increase since more query-link pairs will have a normalized volume greater than $V_{th}$.

Figure 5:
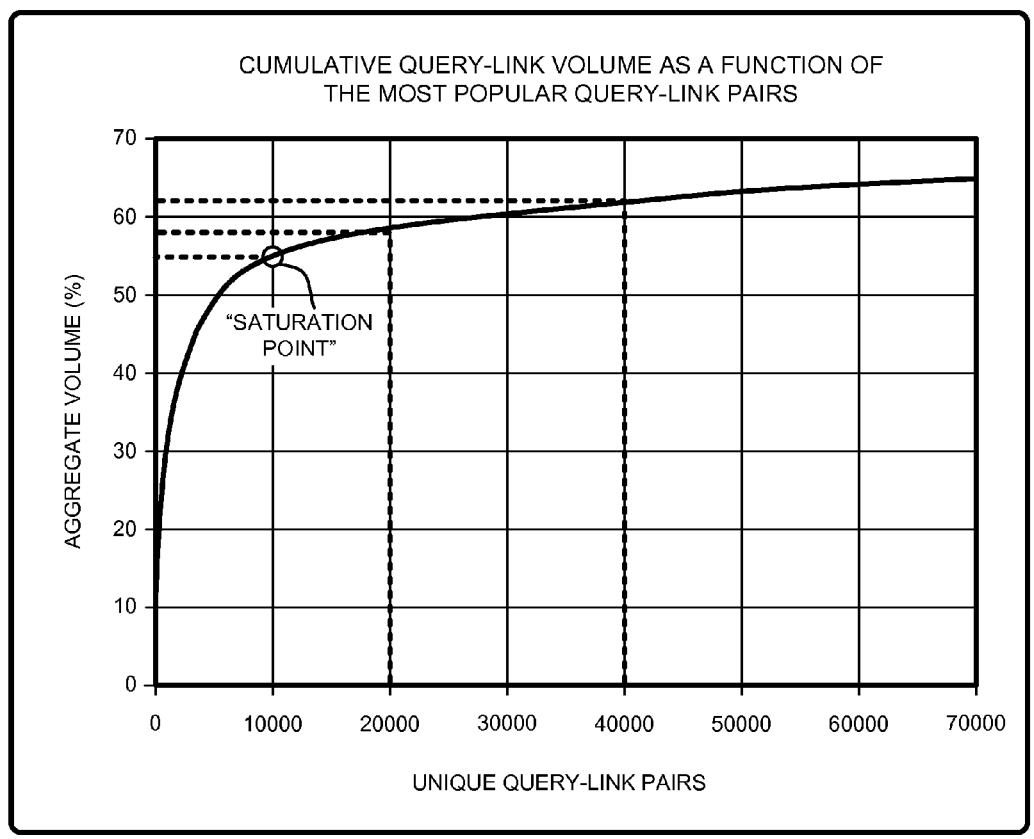
FIG. 5 provides an example of aggregate query-link volume as a function of most popular query-link pairs derived from a record of queries and selected search results from a community of mobile devices, as described herein

One advantage of using the cache saturation threshold can be observed by the graph shown in FIG. 5. In particular, FIG. 5 illustrates an example of aggregate query-link volume as a function of most popular query-link pairs derived from a record of queries and selected search results from a community of mobile devices. From an empirical CDF of the volume of all query-link pairs in the search logs, it is apparent that the value of adding query-link pairs to the local query cache quickly diminishes past some point. This point is referred to herein as a "saturation point" which can be used to set the aforementioned cache saturation threshold. For example, using the example provided by the graph of FIG. 5, after having cached approximately 20000 query-link pairs, even marginally increasing the aggregate volume requires a large number of query-link pairs. For instance, slightly increasing the aggregate volume from 58% to 62% requires doubling the amount of query-link pairs from 20000 to 40000.

In tested embodiments of the Community-Based Mobile Search Cache, evaluation of various mobile search logs has shown that the cache saturation threshold will be quickly reached long before the local query cache begins to approach the memory or storage resources available on the mobile device. In fact, as illustrated by FIG. 5, the saturation point of the cache (using the exemplary data illustrated by the graph) is quickly reached when the most popular query-link pairs that correspond to approximately 55% of the cumulative query-link volume have been cached. At this point, the local query cache (and associated hash table) generally requires less than 2 MB of memory on the mobile device. With memory on typical mobile devices generally being measured in Gigabytes, it should be clear that the local query cache can be easily accommodated within the storage resources available on typical mobile devices.

Independent of which threshold is used (i.e., memory or cache saturation), the methodology described above identifies the n top entries in the sorted query-link data (e.g., Table 1). However, before using these entries to build the local query cache, in various embodiments, the Community-Based Mobile Search Cache first computes a volume-based "ranking score" from the volume information associated with every query-link pair. In general, the ranking score for each query-link pair is produced by normalizing the volume across all links that correspond to the query. For example, in the case of query "myspace" in Table 1 (covering the top two rows of Table 1) has a total volume of 1,950,000 (i.e., 1,000,000+950,000). Therefore, the ranking score for the link "http://mobile.myspace.com" is equal to 1,000,000/1,950,000=0.513, while the ranking score for the link "http://www.myspace.com" is 950,000/1,950,000=0.487. The generated <query, link, score> triplets are then used to build the local query cache. However, as noted above, <query, link, volume> triplets are also used in various embodiments to build the local query cache.

There are a number of inherent advantages in the approach described above. For example, not only does this approach store the most popular queries across all mobile users, but it also stores only the most popular search results for every query. Even though there might be tens or even hundreds of search results available for a given query, only those search results that are popular across all mobile users are cached. Again, this popularity is evidenced, and measured, by a large number of user's selecting a particular link for a particular query. Advantageously, this approach constrains the amount of memory resources required to build the query cache. For instance, in a tested embodiment of the Community-Based Mobile Search Cache, it was observed that an average of 1.5 search results per query were cached based on the use of the above-described cache saturation threshold. This can result into 3 to 5 times lower memory overhead when compared to a simpler approach where some fixed number, M, of the top search results for every popular query are cached.

Another advantage is that each query and search result pair extracted from the search logs has a known volume (i.e., aggregate link selection count by the community of mobile users). By caching the volume (or the normalized volume across all pairs in the cache) of every query-link pair, the mobile device can rank search results for a given query locally without the need to reach a search engine over the 3G or other wireless link.

In addition, by processing the mobile search logs in the manner described above, the Community-Based Mobile Search Cache automatically discovers the most common misspellings of popular queries. In particular, given the cumbersome text input interfaces on phones or other mobile devices, mobile users, as a community, frequently misspell their queries. These frequent misspellings appear in the search logs as popular queries, enabling the Community-Based Mobile Search Cache to cache search results for all these query misspellings. As a result, queries such as "yotube", "facebok", "utube", and "yaho" will be automatically included in the local query cache without specifically considering whether those terms are misspellings of a desired query term. Fortunately, since most search engines are adapted to automatically correct for these types of spellings errors, the resulting query-link pairs will generally be valid for the search that was actually intended by the user.

2.2.1 Query Cache Storage Architecture:

The set of <query, link, score> triplets identified with the methodology described above is efficiently stored on the mobile device. Storage efficiency is defined in two ways. First, the main memory and flash resources required to store the search results should be minimal. Second, the time it takes to retrieve, rank and display search results after the user enters a query should be as low as possible.

In embodiments of the Community-Based Mobile Search Cache that make use of a hash table data structure for linking queries to search results, the hash table is maintained locally (on each mobile device) separate from the query cache (also maintained locally on each mobile device). While both the hash table and the query cache can be maintained in the same storage if desired, there are performance advantages achieved by placing the hash table in system memory (which has significantly faster access times than flash or hard drive-based storage).

In particular, in various embodiments, performance of Community-Based Mobile Search Cache is improved on the mobile device by placing the hash table in main or system memory of the mobile device, with the purpose of the hash table being to link queries to search results. This linkage is done in three steps. First, given a hash of a submitted query the hash table is used to quickly determine whether there are cached search results for the query (i.e., matching hash in the hash table) and thus, if there is a corresponding cache hit or a cache miss in the query cache. Second, in the case of a cache hit, the hash table provides pointers to the database (i.e., the query cache) where the search results for the submitted query are located. Third, along with each search result pointer, the hash table provides its ranking score, enabling the Community-Based Mobile Search Cache to properly rank (and thus order) search results on the phone before displaying them to the user.

The database of search results representing the query cache is placed in flash memory or any other desired storage of the mobile device. The role of the query cache is to store the available search results. Ideally, the query cache is stored in a format that that occupies the least possible storage space while allowing results to be quickly retrieved in order to improve local performance of the Community-Based Mobile Search Cache. However, any desired storage and access format can be used for the query cache. The information stored in the database for each search result includes the necessary information for generating the same or similar user experience that the user would see when directly accessing a conventional search engine using conventional wireless communications techniques. In other words, as with a conventional search engine, the user will be presented with a set of one or more links including actual web address, a short description of the web-site and the human readable form of the web address.

Further, in various embodiments, over time and as the user submits queries and clicks on search results, the Community-Based Mobile Search Cache updates both the hash table and the database of search results. First, every time the user clicks on a search result, its ranking score is increased in the hash table for that particular user. In addition, if a new query or a new search result is selected that does not exist in the query cache (i.e., the Community-Based Mobile Search Cache accesses a remote search engine to retrieve results), both the hash table and the database of that user are updated so that this query and search result can be retrieved from the cache in the future.

2.2.2 Hash Table Architecture:

The following paragraphs describe a hash table-based architecture for mapping queries to search results contained in the local query cache. However, it should be understood that the hash table architecture described below is simply one example of a useful technique for accessing the data in the query cache, and that any desired data access techniques, conventional or otherwise, can be used to access or select the links, advertisements, and/or web pages and documents stored in or with the local query cache.

Figure 6:
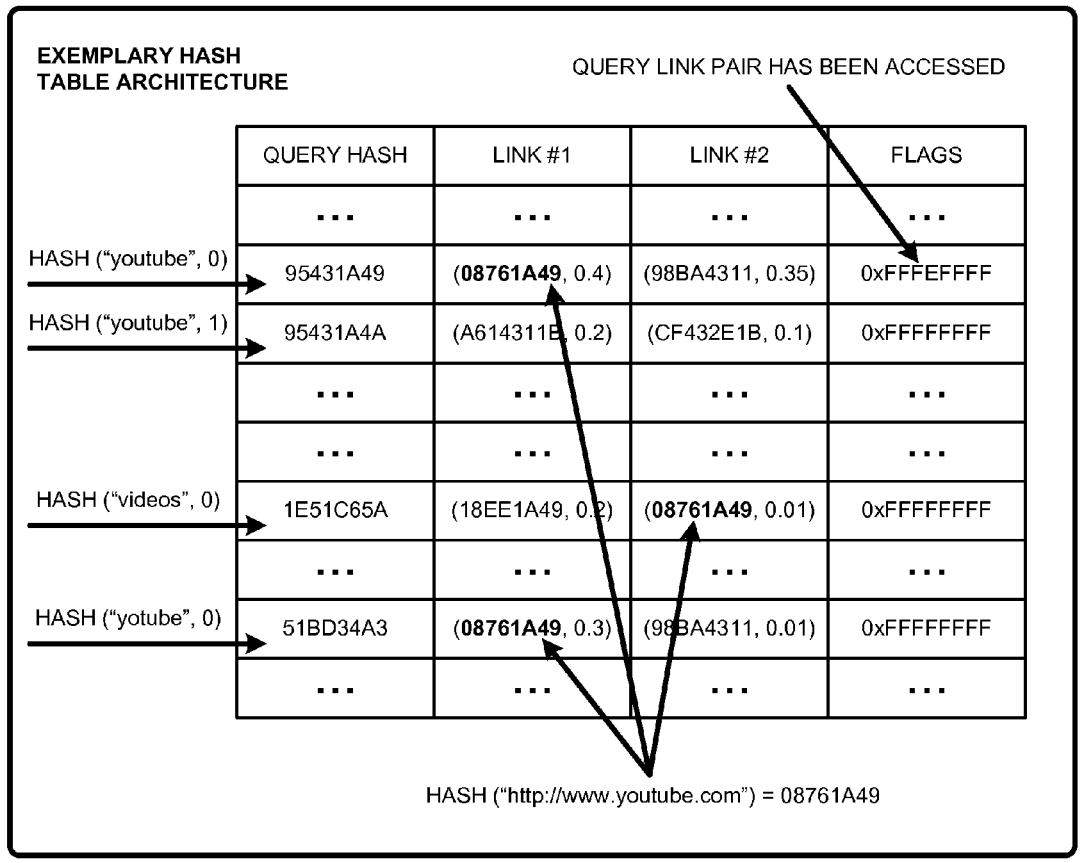
FIG. 6 illustrates an exemplary hash table data structure for linking queries to search results, as described herein.

FIG. 6 shows the structure of an exemplary hash table used to link queries to search results. Note that other types of hash tables may also be used to link queries to search results in the query cache, and that the concepts described herein are not intended to be limited to the precise form of the hash table described for purposes of explanation.

In general, each entry in the hash table structure illustrated by FIG. 6 corresponds to a unique query and has four associated fields. The first field of every entry in the hash table contains the hash value of the query string corresponding to that entry. The next two fields are of identical type and represent two search results associated to the query (i.e., the "Link #1" and "Link #2" fields). Note that more or less than the two "Link" fields shown can be used if desired. However, as noted above, real-world test data used by the Community-Based Mobile Search Cache indicates that every query in the <query, link, score> triplets corresponds, on average, to 1.5 links. As such, using only two "Link" fields helps to minimize the size of the hash table.

Each search result in the hash table is represented by a pair of numbers (e.g., 08761A49, 0.4). The first number (e.g., "08761A49") corresponds to the hash value of the web address of the search result. This value is used to uniquely identify a search result and, as described in further detail below, is used as a pointer to retrieve the information associated to the search result (short description, web address etc.) from the query cache. The second number (e.g., "0.4") corresponds to the ranking score of the search result. The ranking score of every query-link pair is represented by its normalized volume, as described above. The last field of each entry in the hash table is a 64-bit number that is used to log information about the two search results in this entry (the 32 most significantly bits correspond to the first search result while the 32 least significant bits correspond to the second search result). However, in a tested embodiment of the query cache, only one bit for each link was used to indicate if the user has ever accessed the specific query-link pair. The rest of the flag bits are reserved for future purposes. As such, it should be clear that the number of bits in the flag is not of particular relevance.

For example, consider the first entry in the example hash table shown in FIG. 6. This entry corresponds to the query "youtube" and thus, its first field contains the hash value of the string "youtube" (i.e., "95431A49"). The most popular search result for this query (most selected in the mobile community) points to the web address "http://www.youtube.com" and therefore the second field of this entry contains the hash value of this web address along with its ranking score (i.e., "08761A49, 0.4"). Similarly, the third field contains the hash and score information for the next most popular search result for this query (i.e., "98BA4311, 0.35"). Further, from the value of the bit flags, it can be seen that the user has already submitted the query "youtube" on his phone and he has only clicked on the first search result immediately after. Note also that there is a second entry for the term "youtube" in FIG. 6. While this will not be the case for every query term, there can be multiple entries for each query term depending upon the score associated with the links corresponding to that query term.

In general, given a set of <query, link, score> triplets the hash table is generated as follows. For every unique query in the set of triplets, the Community-Based Mobile Search Cache identifies all the links associated to this query. An entry is created in the hash table for the query and search results are added in descending order of score. If more than two links are associated to the same query, additional entries are created in the hash table by properly setting the second argument of the hash function (e.g., ("youtube", 0) and ("youtube", 1) as illustrated in FIG. 6).

It is interesting to note that many popular search results are shared across a large number of queries. For instance, in the example hash table shown in FIG. 6, the search result that corresponds to the web address "http://www.youtube.com" is linked to three different queries (illustrated by the hash value of "08761A49"). In general, an evaluation of real-world data obtained from the search histories of a large community of mobile devices indicates that only approximately 60% of the search results that appear in the <query, link, score> triplets are unique. These factors are considered in the form of the hash table described above avoiding duplicate storage of search results. In particular, as described above, each search result is stored only once and used to link individual queries to each search result independently. As a result, the search result web page for every query is constructed on the fly after parsing the hash table to retrieve all the search results for the query.

2.2.3 Search Results Organization:

As discussed above, the custom database of search results (i.e., the query cache) is maintained in flash memory or other storage on the mobile device and stores all the links that appear in the <query, link, score> triplets extracted from the mobile web search logs. Clearly, this information can be stored in many different formats without departing from the concepts described herein for providing local cache-based search capabilities on mobile devices. As such, it should be understood that the precise form of link storage described below for the query cache is provided only for purposes of explanation, and that the concepts described herein are not intended to be limited to the precise form of the query cache storage techniques that are described for purposes of explanation.

For example, in a tested embodiment of the Community-Based Mobile Search Cache, each search result the query cache was stored by storing its title (which serves as the link to the landing page), a short description of the landing page and the human readable form of the link. A formatted example of this information is illustrated at step S6 (790) of FIG. 7, which shows the following formatted search result:

Facebook Mobile

Facebook is a social utility that connects people with friends and others . . .

m.facebook.com

As such, it should be clear that the Community-Based Mobile Search Cache displays search results in the same or similar way as a conventional search engine would in order to provide a transparent user query/search experience.

In a tested embodiment of the Community-Based Mobile Search Cache, the amount of memory used to store this information for a search result in the query cache is on average 500 bytes. However, the actual memory space required can vary significantly depending on the internal structure of flash chips used in the mobile device. For example, flash memories are generally organized in blocks of fixed size that are usually equal to 2 KB, 4 KB or 8 KB depending on the memory density of the chip. This means that even small files with size less than the size of a flash block, will appear to occupy a full block. For instance, if a 500 byte file containing a single search result is stored in flash memory, then this file will occupy 4, 8 or 16 times more flash space (when 2 KB, 4 KB or 8 KB of block size is used respectively) than its actual size.

Therefore, in order to avoid flash fragmentation, multiple search results are aggregated and stored into fewer files. However, storing a large number of search results into a single file could increase the time it takes the Community-Based Mobile Search Cache to locate and retrieve a search result from the query cache. Consequently, in a tested embodiment of the Community-Based Mobile Search Cache, the way search results are aggregated into files and organized within a file is considered for minimizing both flash fragmentation and cache response times.

For example, assume that the number of database files used in the query cache is some number N. In general, the number N of database files is chosen to balance cache response times and flash fragmentation. In general, the smaller the number of files (e.g., "15.links") used, the lower the impact of flash fragmentation will be. Observations of real world data has demonstrated that when N is anywhere between 32 and 256, the cache's response time is low and almost identical. However, when less than 32 files are used, the average time to fetch two search results and its deviation seem to increase exponentially. Further, when using 32 files, the amount of memory that can be wasted due to flash fragmentation can never exceed 64 KB, 128 KB, or 256 KB depending on the flash block size used (2 KB, 4 KB and 8 KB respectively). Therefore, in a tested embodiment of the Community-Based Mobile Search Cache, the value of N was set at 32.

Figure 7:
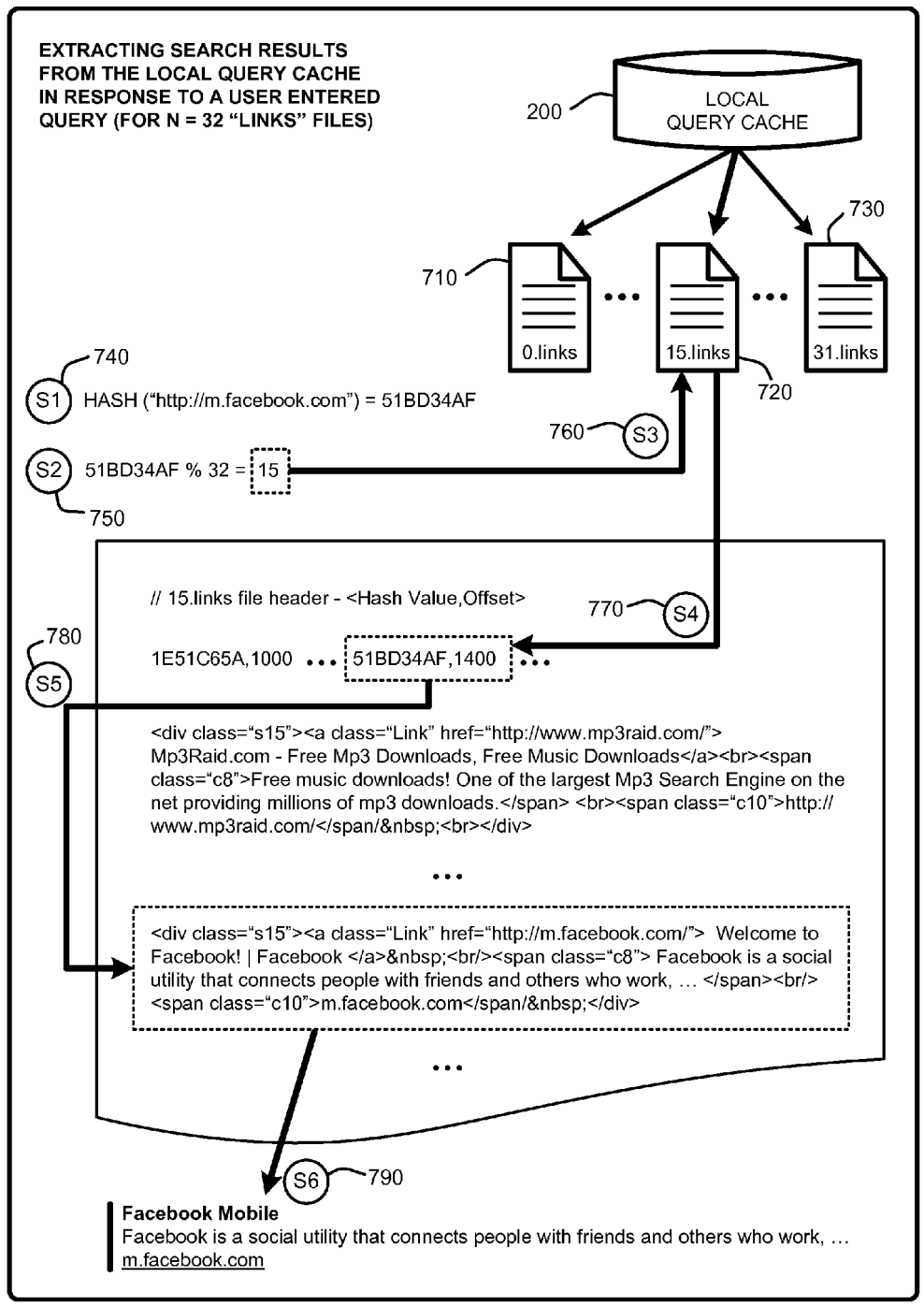
FIG. 7 illustrates an example of a sequence of steps for extracting "search results" from the local query cache in response to a user entered query, as described herein.

FIG. 7 shows how search results are organized within individual database files (710, 720, 730) of the local query cache 200, for a value of N=32. Each search result is assigned to one of the N files based on the hash value of its web address (see step S1 (740) of FIG. 7). In particular, the remainder of the division of the hash value with the number of files in the database (a number between 0 and N−1) is used to identify the file where the search result is stored. This concept is illustrated by step S2 (750) of FIG. 7, where the remainder value of "15" following a modulo division of the hash value of the link by the number of files points to the "15.links" file 720 in step S3 (760).

The first line in each of the N database files of the query cache contains pairs of the form (hashvalue, offset), e.g., "51BD34AF, 1400" as illustrated by step S4 (770) of FIG. 7. The offset (e.g., "1400") represents the actual offset from the beginning of the file where the information for the search result represented by the hash value (e.g., "51 BD34AF") is located. Thus, by parsing the first line of a database file in the query cache, the Community-Based Mobile Search Cache can identify where each search result stored in this file is located. Note that in the example provided by FIG. 7, results are shown as stored in an HTML format that when interpreted are used to present a formatted search result and link to the user. An example of this concept is illustrated by step S5 (780) and step S6 (790) of FIG. 7 which shows the HTML code for the link and associated text at offset "1400" in the "15.links" file. When interpreted and displayed using a conventional HTML interpreter, the user is provided with the search result shown above for the "http://m.facebook.com" link. Note that any other desired language or code, e.g., XML, etc. may also be used instead of HTML, and that the example using Html code is provided only for purposes of explanation.

Note that search results within a database file are not sorted based on their hash value or ranking score. Instead, whenever the user clicks on a search result that is not already cached, the Community-Based Mobile Search Cache will add the search result at the end of the database file and the header of this file is augmented with the (hashvalue, offset) pair for this search result. This allows the Community-Based Mobile Search Cache to easily update the search results database over time. However, as noted above, other database storage and access techniques may be used without departing from the scope of the Community-Based Mobile Search Cache, as described herein.

2.3 Cache Management:

In various embodiments, the contents of the query cache are updated over time. In general, the query cache for each mobile device will contain both a community component and a personal component that becomes increasingly personalized over time. In particular, as discussed in Section 2.3.1, in various embodiments, the Community-Based Mobile Search Cache monitors user clicks over time and adjusts the ranking score of individual search results to reflect the history of user clicks. In addition, in various embodiments, each mobile device periodically connects to the remote server portion of the Community-Based Mobile Search Cache to obtain the latest set of popular queries and links mined from the mobile search logs of the broader community, thereby ensuring that each mobile device has up-to-date information that is available to perform local queries.

2.3.1 Personalized Ranking:

As noted above, in various embodiments, the searching and web browsing behaviors of individual users are evaluated over time to further customize the local query cache downloaded to the mobile devices of specific users. In other words, the Community-Based Mobile Search Cache can monitor the search queries submitted by an individual user and use this information to personalize the query cache.

One key advantage of performing content search and ranking locally on a mobile phone is personalization. The personalized hash table used by the Community-Based Mobile Search Cache is an example of this personalization. In general, the mobile device can learn from past user activities and contextual information to better rank and present contents that fits the preference of the particular user. Performing personalization on the mobile device rather than in the cloud also better preserves user privacy. For example, before receiving or requesting cache and/or hash table updates, the mobile device can filter and aggregate user access logs and activities before sharing it with the community data mining to ensure that personal user data is not available to the remote server or to other users.

In particular, by monitoring user clicks over time, the Community-Based Mobile Search Cache is aware of when and how many times the user selects a link after a given query is submitted. The Community-Based Mobile Search Cache uses this information to incrementally update the ranking score of the cached search results to offer a personalized search experience for individual users.

In general, the Community-Based Mobile Search Cache uses the user selection information to update the ranking scores associated with selected links. Clearly, there are endless techniques for updating scores based on user selection of a corresponding link, and/or decreasing scores for links as time passes without selection. Therefore, for purposes of explanation, one such technique will be illustrated below. However, it must be understood that the ranking processes described below are provided only for purposes of explanation and are not intended to limit the adjustment of ranking scores to the example described.

For example, assume that for a query Q there are two search results $R_1$ and $R_2$ available in the query cache. Every time the user submits the query Q and clicks on the search result $R_1$, the Community-Based Mobile Search Cache updates the ranking scores $S_1$ and $S_2$ for the two search results $R_1$ and $R_2$ respectively, as follows:

$$S_1 = S_1 + 1 \quad \quad \text{Equation (1)}$$

$$S_2 = S_2 * e^{-\lambda} \quad \quad \text{Equation (2)}$$

In this example, as illustrated by Equation (1), the ranking score of the selected search result is increased by 1, which represents the maximum possible score of a search result extracted from the mobile search logs (based on the normalized volume, as described above). In this way, the Community-Based Mobile Search Cache favors search results that the user has selected. Note that if this search result did not initially exist in the cache (selected after a cache miss), then a new entry in the hash table is created that links the submitted query to the selected search result and its score becomes equal to 1. At the same time, the ranking score for each unselected search result is exponentially decreased, as illustrated by Equation (2). Note that the adjustable parameter "$\lambda$" in Equation (2) is used to control how fast the ranking score is decayed. This enables the Community-Based Mobile Search Cache to consider the "freshness" of user clicks. For instance, if search result $R_1$ was clicked 100 times one month ago and search result $R_2$ was clicked 100 times during the last week, then the ranking score for $R_2$ will be higher.

Using Equations (1) and (2), the ranking score of the search results, at any given time, reflects both the number and freshness of past user clicks. Again, as noted above, in practice, any desired personalization ranking algorithm can be used to score links in the query cache.

2.3.2 Updating the Query Cache Over Time:

As noted above, the query cache may be periodically updated so that it remains current. In various embodiments, periodic updating of the query cache is achieved by periodically performing the above-described data mining, either on a global basis (i.e., search history of all users of mobile devices), or based on the search queries of one or more groups or subgroups of users (typically numbering in the thousands or millions).

Updates are provided to individual users either as completely new query cache files, or as update files or "patches" that allow the query cache and or hash tables on individual mobile devices to be locally updated on each mobile device. Note that the patches or "patch files" contain only the information necessary to update the files already existing on the corresponding mobile device, rather than complete copies of each of those files. However, one or more complete files can be transmitted in place of such updates, if desired, in order to reset the query cache to a community state, or to replace damaged or missing files on a particular mobile device. Note that these changes or updates for each mobile device can either be automatically pushed to individual devices on any desired periodic schedule, or can be requested by individual mobile devices at any automated or user desired time.

For example, in the case of individual device requested updates, each mobile device in a tested embodiment of the Community-Based Mobile Search Cache transmits its current version of the hash table to the remote server portion of the Community-Based Mobile Search Cache. The mobile device also transmits the headers of the 32 files (see discussion in Section 2.2.3 with respect to FIG. 7) in the database of search results (i.e., the "query cache"). As discussed above, and as illustrated by FIG. 7, the header of each file in the query cache includes the hash of each search result and offset value for each search result in each such file.

Consequently, this information (i.e., hash table and file headers) gives the server a complete picture of which links (and the current ranking score for those links) are held by the particular mobile device without requiring the mobile device to transmit the HTML or other code that defines each link to the server. See for example step S5 (780) and step S6 (790) of FIG. 7 which shows the HTML code for the link and associated text at offset "1400" in the "15.links" file. Given this information, the remote server first runs through the hash table and removes query-link pairs that have not been accessed by the user in the past. This can be easily done by examining the flags column in the hash table (see discussion of FIG. 6 in Section 2.2.2). The query-link pairs that have been accessed by the user in the past are not removed from the cache because of the observed high repeatability of mobile queries for individual users.

Note that in various embodiments, the two above-described rules relating to adding or removing content from the hash table of individual mobile devices are not absolute. For example, in various embodiments, query-link pairs that are highly popular with a broad community of users may not necessarily be removed from the hash table. Similarly, if a significant amount of time has passed since a particular user accessed a particular link the corresponding link may be removed from the hash table.

As a separate operation from receiving hash tables and header files from individual mobile devices, the remote server periodically (e.g. daily or every several hours) extracts the most popular queries and links from the mobile search logs as described above in Sections 2.1 and 2.2, and uses this information to construct a new hash table and corresponding query cache. This periodic update is performed once for all users (or particular groups or subgroups of users, as described above). However, a "merging phase" is then performed on an individual user basis for every user or mobile device (based on the information provided by each mobile device to the remote server. During this merging process, conflicts might arise in the sense that a query-link pair that already exists in the hash table (previously accessed by the user) might re-appear in the popular set of queries and links extracted on the server. The conflict is caused when the ranking score stored in the hash table is different from the new ranking score computed on the server based on the search log analysis. The Community-Based Mobile Search Cache automatically resolves such conflicts by simply adopting the search results having the maximum ranking score (see Section 2.2 for a discussion of "ranking scores").

After the hash table of each individual mobile device has been updated, the remote server uses the 32 header files to create the necessary patch files for the database files of the query cache for each corresponding mobile device. The new hash table and the 32 patch files are transmitted to the phone and the new local query cache becomes available to the user as soon as the mobile device replaces the old hash table and updates the files of the local query cache using the patch files. Note that if one or more of these files do not require updates (e.g., no changes) then fewer than 32 patch files may be transmitted to the user. In a tested embodiment, the amount of data exchanged between each mobile device and the remote server for the purpose of updates is typically less than 2.5 MB given that the Community-Based Mobile Search Cache requires, on average, approximately 200 KB for storing the hash table and 1 MB for storing the search results. This amount can be further reduced by leveraging conventional data compression techniques prior to transmitting the updates to the individual mobile devices.

Note also that the update information transmitted to any particular mobile device is then downloaded to mobile devices either on-demand or whenever a good opportunity presents itself. Preferably, though not necessarily, this updated information is automatically downloaded to individual mobile devices at a time that will reduce or eliminate the need for the mobile device to use 3G, WiFi, or other wireless links during the download process. For example, in various embodiments, the update information can be downloaded to the user's desktop, laptop, or netbook computer via a typical Internet or network connection, which is then "synched" or otherwise copied to the mobile device to transfer or update a current copy of the query cache on the mobile device. However, conventional wireless links may also be used at any time to ensure that that the user has a current local query cache available for performing searches.

2.4 Caching Additional Content:

A caching architecture like the Community-Based Mobile Search Cache is not limited to improving mobile search experience. As the storage and processing capabilities of mobile devices continue to improve, other frequently accessed contents such as local business listing, coupons and promotions, blogs and reviews, popular web sites, as well as certain contents on personal computers can be cached on the devices for fast user access on the go. In fact, given typical storage size being measured in gigabytes on mobile devices, local storage of large amounts of additional user-specific content is enabled by the Community-Based Mobile Search Cache.

As noted above, in various embodiments, the Community-Based Mobile Search Cache caches additional advertisements (see Section 2.5), documents or materials in the query cache based either, or both, on individual user access patterns or community access patterns. For example, in the case of a local user, if a particular user's calendar shows a meeting scheduled with a particular person, or at a particular place or within a broader geographic region, content corresponding these or other criteria can be automatically cached locally on the user's mobile device. A simple example is that if the user has a meeting scheduled for a two day period in Los Angeles, maps and restaurant guides, or other popular content (based on mobile search log mining) for the Los Angeles area can be automatically downloaded or cached on the user's mobile device. In this case, selection of corresponding links returned in response to a user query can be served locally rather than requiring the mobile device to access the Internet, cloud or other network using a wireless communications protocol.

Further, in various embodiments, the Community-Based Mobile Search Cache will also scan local documents existing on the user's mobile device to extract and index various key words, including names, places, dates, etc. This information will then be included in the local query cache. If the user then enters a query term corresponding to one of those key words, links to the corresponding local documents will be returned along with any other corresponding links from the local query cache.

Caching of additional documents may also be based on other factors such as contact lists, email messages, etc. For example, if two Bluetooth® connect and swap contact lists or email messages, documents or links related to any of those new contacts or email messages can be cached and/or indexed as described above such that if the user then enters a query term corresponding to one of those contacts or email messages, links to the corresponding cached documents will be returned along with any other corresponding links from the local query cache.

Further, in addition to caching search results, the content of related web pages for popular queries may also be included in the local query cache. This allows users to view a web page or link (or even an entire web site) corresponding to their query without needing to connect to the Internet. In other words, if a web page or document is cached in or with the query cache, user selection of a corresponding link from the search results page presented to the user in response to the query, then that page is served locally rather than requiring the mobile device to use its radio to retrieve that web page or document.

Further, in related embodiments, a cached web page or document is displayed in direct response to a user query without first displaying cached search results when a corresponding search result has a sufficiently high click-through probability to that web page or document. For example, in such embodiments, whenever a search query is associated with sufficiently high probability to a specific cached web page, that web page is displayed to the user immediately following entry of the query without first displaying the search results for that query. For example, if the user enters a query such as "MSN weather Seattle" on her mobile device, the Community-Based Mobile Search Cache will simply return the MSN® mobile version of the weather web page for Seattle rather than a list of ranked search results corresponding to the user query if this weather page is cached in or with the query cache.

2.5 Caching and Displaying Advertisements:

As is well known to those skilled in the art, typical search providers sell ad space on search results pages, with advertisements related to user queries being displayed on the search results page along with the search results. This concept is leveraged in various embodiments of the Community-Based Mobile Search Cache by locally caching a plurality of advertisements that are in some way related to the content in the local query cache (based on a variety of predetermined criteria, as discussed below). Note that locally cached advertisements are included in, or in conjunction with, the local query cache. Thus, in various embodiments, the Community-Based Mobile Search Cache is provided with the capability to automatically display one or more relevant advertisements to the user as he types a query.

In particular, in the case of locally cached advertisements, one or more of these advertisements are displayed on the search results page along with the search results presented to the user in response to the user entered query. Advertisements are selected for display and placement based on various predetermined criteria and/or locally available information, such as, for example, predefined keyword associations, user location, user search history, user shopping history, user click-through history, etc. Note that criteria for advertisement selection and placement are well known and will not be described in detail herein. For advertiser billing purposes, counts are kept of advertisement displays, placements, and clicks on individual mobile devices. These counts are then periodically reported back to a remote advertisement component of the Community-Based Mobile Search Cache that then computes and reports advertisement billing amounts for each corresponding advertiser. Note that the concepts of billing advertisers for display, placement, and/or and clicks of advertisements are known to those skilled in the art, and will not be described in detail herein.

2.6 Synthesizing Search Results Pages from the Query Cache:

As detailed above, deterministic or probabilistic caching of popular results (and possibly other content, as discussed above) allows the Community-Based Mobile Search Cache to immediately return search results and/or web pages to the user from the local query cache without requiring the mobile device to access the Internet or cloud using the 3G or other wireless connection. In general, this capability is enabled by extracting information from the local query cache corresponding to query terms matching the user input. This information is then used to render or construct one or more search results pages on the fly.

For example, as discussed in Section 2.2.3 with respect to FIG. 7, for every link, the Community-Based Mobile Search Cache stores the links web address, a short description of the link and a human readable form of its web address. Further, as discussed above, the hash table maps queries to links that are sorted based on their ranking scores. Thus, for each user query, the Community-Based Mobile Search Cache retrieves all this information from the local query cache and forms the search results web page on the fly. In particular, results pages are formed by compiling one or more pages of links comprising the links matching the user entered query. See the discussion of FIG. 7 in Section 2.2.3 for an exemplary process for selecting and displaying individual links to the user in response to a user entered query. In addition, as discussed in Section 2.5, the search results page may also include one or more advertisements related to the user entered query.

Consequently, the result of these capabilities is that the Community-Based Mobile Search Cache enables the user to enter queries on a mobile device that appear to the user to return full database searches using the power of one or more remote servers without needing to connect to the Internet or other network.

2.7 Automatic Bookmark or "Favorites" Creation:

As explained above, in various embodiments, the Community-Based Mobile Search Cache provides for automatic creation of bookmarks or a favorites list based on a subset of the most popular searches of the overall mobile community, or on one or more subsets of the overall mobile community. In general, the local query cache is evaluated to extract a set of the highest probability links to automatically create a list of favorite links. This list can be any length desired, and are presented to the user in a manner similar to favorites lists in a browser type application, such as, for example Internet Explorer®. For example, while the list of favorites can be any length desired, some number (e.g., 15 links) of the most frequently selected unique links (based on the aforementioned query, link, volume triplets) are simply presented to the user as a user selectable list. In various embodiments, this list of favorites is user editable, has a user selectable size, and can be displayed to the user on demand via user selection of a favorites button, a favorites menu item, etc.

2.8 Auto-Complete Functionality:

Since retrieving search results from the local query cache generally takes only tens of milliseconds, in various embodiments, search retrieval is combined with query auto-complete processes to further improve the mobile search user interface by reducing the number of query key strokes. For example, additional mining of the query cache is used in various embodiments to construct a "dictionary" of popular search queries. Then, while a user types search query characters, the Community-Based Mobile Search Cache looks in that dictionary to find the most popular queries that start with the contents being entered by the user into the search textbox. The corresponding search results can be immediately displayed in the main window, without user pressing the search button.

For example, after typing "f" in the search box, the search box auto-completes it as "facebook" and the search result (i.e. http://mobile.facebook.com) is already shown in the result panel of the page. If the next letter typed by the user is then "i" instead of an "a" (i.e., "fi") then the auto-complete functionality will replace the "facebook" auto-completion with some other popular term (e.g., "fine art") and any corresponding links from the query cache. Further, if the user does not find the desired search results after finishing typing a query term, she can then click the search button and use the online service to perform a conventional search. As such, the use of the Community-Based Mobile Search Cache can be completely transparent to the user.

Figure 8:
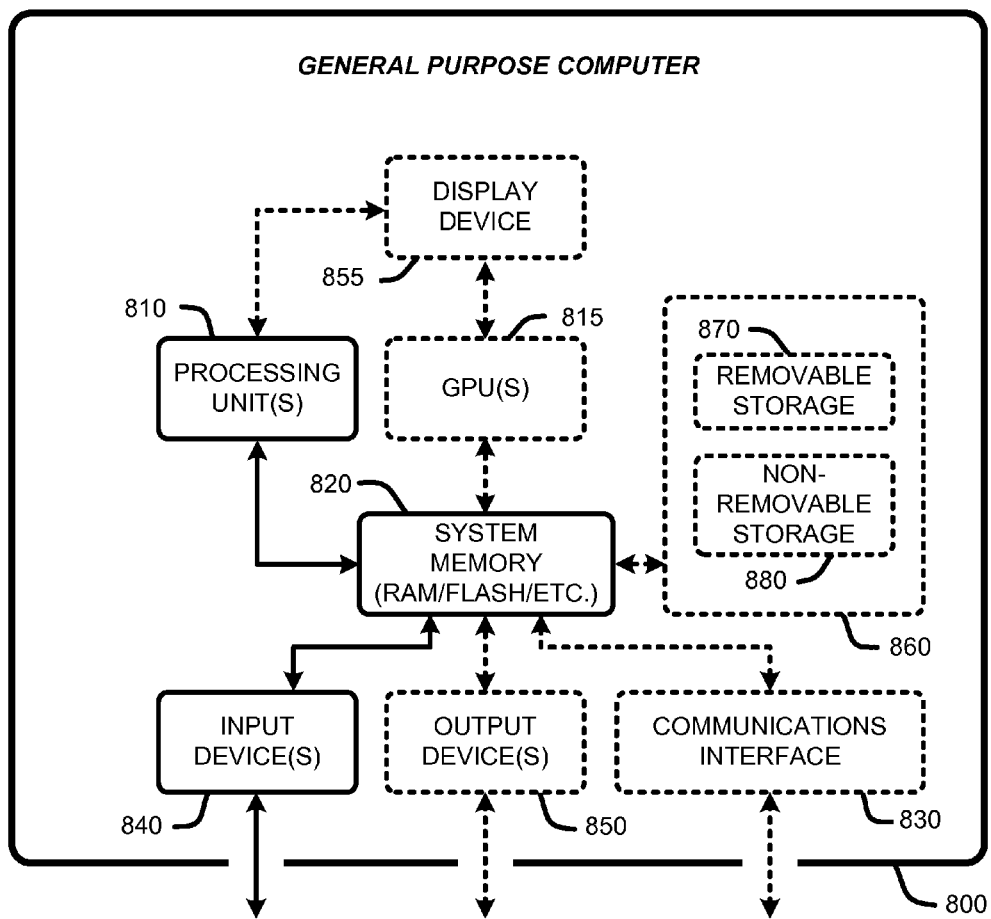
FIG. 8 is a general system diagram depicting a simplified general-purpose computing device having simplified computing and I/O capabilities for use in implementing various embodiments of the Community-Based Mobile Search Cache, as described herein.

3.0 Exemplary Operating Environments:

The Community-Based Mobile Search Cache described herein is operational within numerous types of general purpose or special purpose computing system environments or configurations. FIG. 8 illustrates a simplified example of a general-purpose computer system on which various embodiments and elements of the Community-Based Mobile Search Cache, as described herein, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

To allow a mobile device to implement the Community-Based Mobile Search Cache, the device should have a sufficient computational capability to process the local query cache constructed on the remote server, as described above. In particular, as illustrated by FIG. 8, the computational capability is generally illustrated by one or more processing unit(s) 810, and may also include one or more GPUs 815. Note that that the processing unit(s) 810 of the general computing device of may be specialized microprocessors, such as a DSP, a VLIW, or other micro-controller, or can be conventional CPUs having one or more processing cores, including specialized GPU-based cores in a multi-core CPU. The mobile device also includes system memory 820 in the form of RAM, flash memory, etc.

In addition, the simplified computing device of FIG. 8 may also include other components, such as, for example, a communications interface 830. The simplified computing device of FIG. 8 may also include one or more conventional computer input devices 840. The simplified computing device of FIG. 8 may also include other optional components, such as, for example one or more conventional computer output devices 850. Finally, the simplified computing device of FIG. 8 may also include storage 860 that is either removable 870 and/or non-removable 880. Note that typical communications interfaces 830, input devices 840, output devices 850, and storage devices 860 for general-purpose computers are well known to those skilled in the art, and will not be described in detail herein.

The foregoing description of the Community-Based Mobile Search Cache has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Community-Based Mobile Search Cache. It is intended that the scope of the invention be limited not by this detailed description, but rather by the claims appended hereto.

What is claimed is:

1. A method for providing query search results for mobile communications devices, comprising steps for:
   for each of two or more different communities of mobile communications devices, constructing at least one query cache from contents of one or more historical query logs of each of the communities of mobile communications devices;
   wherein constructing at least one query cache for each of the two or more different communities of mobile communications devices inherently results in the construction of a set of two or more different query caches;
   wherein the contents of each query cache include a set of query terms and corresponding links from the historical query logs;
   selecting one or more of the query caches from the set of two or more query caches by determining which of the corresponding communities are similar to a community associated with one or more particular mobile communications devices and providing the selected query caches to the one or more particular mobile communications devices; and
   on one or more of the mobile communications devices, locally servicing queries using one or more of the query caches provided to each particular mobile communications device without accessing an external query search service.

2. The method claim 1 wherein constructing any of the query caches from contents of the historical query logs further comprises steps for:
   examining the contents of historical query logs to extract pairs of queries and corresponding user selected links (i.e., "query/link pairs") returned by individual search histories recorded in those logs;
   sorting the extracted query/link pairs in order of aggregate user selection volume associated with each query/link pair to construct a set of sorted query/link pairs; and
   adding sorted query/link pairs to the query cache, beginning with the query/link pair having the highest aggregate volume then sequentially selecting the query/link pair having the next highest aggregate volume, until the query cache reaches a desired size.

3. The method of claim 2 further comprising steps for locally personalizing the query cache previously provided to a particular mobile communications device by re-ranking query/link pairs in the query cache as a direct function of user interactions with any corresponding link and regardless of any aggregate volume associated with the corresponding query/link pair.

4. The method of claim 2 wherein locally servicing queries further comprises steps for using matching query/link pairs corresponding to the query for dynamically synthesizing and displaying a search results page on the mobile communication device, and wherein links on the search results page are ordered by aggregate volume.

5. The method of claim 4 wherein probabilistic search string matching is used to determine whether a query is a match to query/link in the query cache.

6. The method of claim 4 further comprising steps for associating a click-through probability with one or more of the query/link pairs, and wherein any link having a click-through probability above a predetermined threshold is used to directly present contents of that link in response to a corresponding query without first presenting a search results page on the mobile communication device.

7. The method of claim 1 wherein a hash table architecture is used to construct each query cache, such that each unique link is stored only once in the query cache, with a unique hash of that link being stored along with every corresponding query term.

8. The method of claim 1 wherein each query cache is constructed using a "cache saturation threshold" that limits the contents of the query cache to query/link pairs having a normalized volume greater than a predetermined threshold.

9. The method of claim 1 wherein a specific community of mobile communications devices determined to reside within a predetermined geographic region is used to construct at least one of the query caches.

10. The method of claim 1 wherein a specific community of mobile communications devices determined to correspond to a predetermined demographic group is used to construct at least one of the query caches.

11. The method of claim 1 further comprising periodically updating the contents of one or more query caches by providing a set of update information to one or more corresponding mobile communications devices.

12. The method of claim 1 further comprising steps for:
   locally caching additional content, including any of electronic documents, advertisements, and web pages, in conjunction with one or more of the query caches provided to one or more of the mobile communications devices; and
   wherein any of the additional content corresponding to a selected link is presented from the cache without accessing an external network.

13. The method of claim 1 wherein a specific community of mobile communications devices determined to correspond to a predetermined demographic group is used to construct the query cache.

14. A system for servicing queries on mobile devices, comprising:
   a device for constructing a "query cache" for each of two or more different communities of mobile communications devices from contents of a historical query log of each corresponding community of mobile communications devices, each said query cache including a set of query terms and corresponding links (i.e., "query/link pairs") extracted from the historical query logs;
   wherein constructing a query cache for each of the two or more different communities of mobile communications devices inherently results in the construction of a set of two or more different query caches;
   a device for selecting one or more of the query caches from the set of two or more query caches by determining which of the corresponding communities are similar to a community associated with one or more particular mobile communications devices and providing the selected query caches to the one or more particular mobile communications devices; and
   a device on each mobile communications device for locally servicing queries using the local query cache provided to each particular mobile communications device without accessing an external network to interact with a remote query search service.

15. The system of claim 14 wherein locally servicing queries further comprises a device for using query/link pairs matching the query for dynamically synthesizing and displaying a search results page on the mobile communication device.

16. The system of claim 14 wherein a hash table architecture is used to map queries to links in the query cache.

17. A computer-readable hardware storage device having computer executable instructions stored therein for generating a query cache to be provided to mobile communications devices for locally handling searches of query terms, said instructions comprising:

allowing user selection of one or more of query caches from a set of two or more different query caches, each query cache generated from a different community of mobile devices, and providing the selected query caches to a mobile communications device of the user; and on the user's mobile communications device, locally servicing queries using one or more of the query caches provided to the user's mobile communications device in response to the user selection without accessing an external query search service.

18. The computer-readable hardware storage device of claim 17 wherein the computer executable instructions for constructing the query caches further comprises instructions for:

examining the contents of historical query logs to extract pairs of queries and corresponding user selected links (i.e., "query/link pairs") returned by individual search histories recorded in those logs;

sorting the extracted query/link pairs in order of aggregate user selection volume associated with each query/link pair to construct a set of sorted query/link pairs; and adding sorted query/link pairs to the query cache, beginning with the query/link pair having the highest aggregate volume then sequentially selecting the query/link pair having the next highest aggregate volume, until the query cache reaches a desired size.

19. The computer-readable hardware storage device of claim 17 wherein a specific community of mobile communications devices determined to correspond to a predetermined demographic group is used to construct at least one of the query caches.

* * * * *